(12) United States Patent
Li et al.

(10) Patent No.: US 12,323,210 B2
(45) Date of Patent: Jun. 3, 2025

(54) TECHNIQUES FOR DETERMINING CHANNEL STATE INFORMATION USING A NEURAL NETWORK MODEL

(71) Applicant: QUALCOMM INCORPORATED, San Diego, CA (US)

(72) Inventors: Qiaoyu Li, Beijing (CN); Yu Zhang, San Diego, CA (US); Liangming Wu, Beijing (CN); Hao Xu, Beijing (CN); Rui Hu, Beijing (CN); Chenxi Hao, Beijing (CN); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/253,427

(22) PCT Filed: Jan. 29, 2021

(86) PCT No.: PCT/CN2021/074347
§ 371 (c)(1),
(2) Date: May 18, 2023

(87) PCT Pub. No.: WO2022/160235
PCT Pub. Date: Aug. 4, 2022

(65) Prior Publication Data
US 2023/0421223 A1    Dec. 28, 2023

(51) Int. Cl.
*H04B 7/06* (2006.01)
*H04B 7/0456* (2017.01)
*H04B 17/391* (2015.01)

(52) U.S. Cl.
CPC ......... *H04B 7/0626* (2013.01); *H04B 7/0456* (2013.01); *H04B 17/3913* (2015.01)

(58) Field of Classification Search
CPC ................ H04B 7/0626; H04B 7/0456; H04B 17/3913; H04B 7/0639
See application file for complete search history.

(56) References Cited

U.S. PATENT DOCUMENTS 9,051,066 B1 * 6/2015 Malone ............ A61B 5/150366
10,630,363 B2    4/2020 Xu et al.
(Continued)

FOREIGN PATENT DOCUMENTS

BE    884976 A  * 12/1980 ............. B01D 53/10
CA    2935464 A1 *  7/2015 ............. H01Q 9/285
(Continued)

OTHER PUBLICATIONS

International Search Report and Written Opinion—PCT/CN2021/074347—ISA/EPO—Oct. 21, 2021.
(Continued)

*Primary Examiner* — Berhanu Tadese
(74) *Attorney, Agent, or Firm* — Holland & Hart LLP/Qualcomm

(57) ABSTRACT

Methods, systems, and devices for wireless communications are described. A user equipment (UE) may receive a first indication of a first number of antenna ports for which the UE may report channel state information (CSI), and a second indication of a second number of antenna ports on which the UE may measure CSI reference signals (CSI-RSs). The second number may be less than the first number. The UE may receive a third indication of one or more neural networks to be used by the UE for determination of the CSI associated with the first number. The UE may determine the CSI using the one or more neural networks and using measurements made by the UE on the second number as inputs to the one or more neural networks. The UE may
(Continued)

transmit a report including the CSI associated with the first number determined via the one or more neural networks.

30 Claims, 16 Drawing Sheets

(56) References Cited

U.S. PATENT DOCUMENTS

| | | | | |
|---|---|---|---|---|
| 11,246,173 B2* | 2/2022 | Vahdat | | H04B 7/0452 |
| 11,324,018 B2* | 5/2022 | Chen | | H04W 72/51 |
| 11,537,896 B2* | 12/2022 | Choi | | G06N 3/048 |
| 11,696,119 B2* | 7/2023 | Bao | | H04W 8/245 |
| | | | | 455/418 |
| 11,936,452 B2* | 3/2024 | Yoo | | H04L 1/0041 |
| 12,009,888 B2* | 6/2024 | Girnyk | | G06N 3/08 |
| 2016/0315683 A1 | 10/2016 | Liu et al. | | |
| 2017/0062735 A1* | 3/2017 | Takeda | | C09K 11/06 |
| 2017/0113247 A1* | 4/2017 | Wang | | H01M 50/403 |
| 2019/0362237 A1* | 11/2019 | Choi | | G06N 3/044 |
| 2020/0007208 A1* | 1/2020 | Zhou | | H04B 7/0617 |
| 2020/0045709 A1* | 2/2020 | Seo | | H04W 72/53 |
| 2020/0259615 A1* | 8/2020 | Wang | | H04L 5/0051 |
| 2020/0367264 A1* | 11/2020 | Chen | | H04W 72/51 |
| 2021/0105785 A1* | 4/2021 | Manolakos | | H04L 5/0026 |
| 2021/0110261 A1* | 4/2021 | Lee | | H04L 25/0254 |
| 2021/0144779 A1* | 5/2021 | Vahdat | | G06N 3/08 |
| 2021/0194548 A1* | 6/2021 | Pezeshki | | G06N 3/045 |
| 2021/0273707 A1* | 9/2021 | Yoo | | H04L 1/0041 |
| 2022/0311656 A1* | 9/2022 | Vaishnavi | | H04L 41/0813 |
| 2023/0035971 A1* | 2/2023 | Girnyk | | G06N 3/08 |
| 2023/0155653 A1* | 5/2023 | Hao | | H04B 7/0626 |
| | | | | 370/252 |
| 2023/0188302 A1* | 6/2023 | Vitthaladevuni | | H04B 7/0417 |
| | | | | 370/329 |
| 2023/0224134 A1* | 7/2023 | Li | | H04L 5/0048 |
| | | | | 370/329 |
| 2023/0246693 A1* | 8/2023 | Vitthaladevuni | | H04L 1/0026 |
| | | | | 370/252 |
| 2023/0328559 A1* | 10/2023 | Manolakos | | H04L 41/0806 |
| | | | | 370/252 |
| 2023/0337043 A1* | 10/2023 | Pateromichelakis | | |
| | | | | H04W 28/0263 |
| 2023/0403543 A1* | 12/2023 | Pateromichelakis | | H04W 24/02 |
| 2023/0412608 A1* | 12/2023 | Vaishnavi | | H04L 63/102 |
| 2023/0421223 A1* | 12/2023 | Li | | H04B 17/3913 |
| 2024/0049015 A1* | 2/2024 | Li | | H04B 7/0639 |
| 2024/0089047 A1* | 3/2024 | Yoo | | H04L 5/0048 |
| 2024/0283507 A1* | 8/2024 | Ly | | H04B 7/0482 |

FOREIGN PATENT DOCUMENTS

| | | | | | |
|---|---|---|---|---|---|
| CA | 2935464 C | * | 5/2019 | | H01Q 9/285 |
| CN | 105991244 A | * | 10/2016 | | H04B 17/24 |
| CN | 108566255 A | * | 9/2018 | | |
| CN | 109474316 A | * | 3/2019 | | H04B 7/0417 |
| CN | 111010890 A | * | 4/2020 | | H04L 1/0026 |
| CN | 111277312 A | * | 6/2020 | | |
| CN | 111434049 A | * | 7/2020 | | G06N 3/006 |
| CN | 111277312 B | * | 10/2020 | | |
| CN | 111919220 A | * | 11/2020 | | G06F 18/214 |
| CN | 111954309 A | * | 11/2020 | | H04L 5/0053 |
| CN | 112040400 A | * | 12/2020 | | G06N 3/0454 |
| CN | 112425235 A | * | 2/2021 | | H04B 7/0617 |
| CN | 112653495 A | * | 4/2021 | | H04B 7/0413 |
| CN | 111434049 B | * | 6/2021 | | G06N 3/006 |
| CN | 112040400 B | * | 8/2021 | | G06N 3/0454 |
| CN | 113283571 A | * | 8/2021 | | G06N 3/006 |
| CN | 113765830 A | * | 12/2021 | | H04B 7/0626 |
| CN | 114616762 A | * | 6/2022 | | H04B 7/0617 |
| CN | 111010890 B | * | 7/2022 | | H04L 1/0026 |
| CN | 115136152 A | * | 9/2022 | | G06N 3/008 |
| CN | 113765830 B | * | 12/2022 | | H04B 7/0626 |
| CN | 115443614 A | * | 12/2022 | | G06N 20/10 |
| CN | 115443710 A | * | 12/2022 | | H04B 7/0608 |
| CN | 115485995 A | * | 12/2022 | | G06N 3/044 |
| CN | 115516957 A | * | 12/2022 | | H04B 7/0626 |
| CN | 115989639 A | * | 4/2023 | | G06N 3/04 |
| CN | 116458103 A | * | 7/2023 | | G06N 3/045 |
| CN | 112653495 B | * | 8/2023 | | H04B 7/0413 |
| CN | 116830466 A | * | 9/2023 | | H04B 17/3913 |
| CN | 116941272 A | * | 10/2023 | | H04B 7/0626 |
| CN | 117639853 A | * | 3/2024 | | H04B 7/0617 |
| CN | 118235336 A | * | 6/2024 | | H04B 7/0469 |
| CN | 111919220 B | * | 10/2024 | | G06F 18/214 |
| EP | 2935464 B1 | * | 8/2017 | | C08K 3/36 |
| EP | 4050812 A1 | * | 8/2022 | | H04B 7/0617 |
| EP | 4135226 A1 | * | 2/2023 | | G06N 3/044 |
| EP | 4262121 A1 | * | 10/2023 | | G06N 3/045 |
| ES | 2935464 T3 | * | 3/2023 | | A61B 10/0045 |
| FR | 2935464 A1 | * | 3/2010 | | F02K 3/10 |
| FR | 2935464 B1 | * | 10/2018 | | F02K 3/10 |
| JP | 2008278181 A | * | 11/2008 | | |
| JP | 2009260651 A | * | 11/2009 | | |
| JP | 2015176266 A | * | 10/2015 | | |
| JP | 2017048178 A | * | 3/2017 | | C07D 209/80 |
| JP | 2022048745 A | * | 3/2022 | | |
| JP | 2022053148 A | * | 4/2022 | | |
| JP | 2024172918 A | * | 12/2024 | | |
| TW | 202027440 A | * | 7/2020 | | G06N 3/0445 |
| WO | WO-2014099187 A1 | * | 6/2014 | | C08K 3/36 |
| WO | WO-2015100670 A1 | * | 7/2015 | | H01Q 9/285 |
| WO | WO-2015176266 A1 | * | 11/2015 | | H04B 7/0413 |
| WO | WO-2017048178 A1 | * | 3/2017 | | H04B 7/0626 |
| WO | WO-2021077419 A1 | * | 4/2021 | | H04B 7/0617 |
| WO | WO-2021088441 A1 | * | 5/2021 | | G06N 3/04 |
| WO | WO-2021126907 A1 | * | 6/2021 | | G06N 3/008 |
| WO | WO-2021217489 A1 | * | 11/2021 | | H04B 7/0608 |
| WO | WO-2021217519 A1 | * | 11/2021 | | G06N 3/044 |
| WO | WO-2021226789 A1 | * | 11/2021 | | H04B 7/0626 |
| WO | WO-2021244344 A1 | * | 12/2021 | | H04B 7/0626 |
| WO | WO-2022040665 A1 | * | 2/2022 | | H04B 7/0626 |
| WO | WO-2022041196 A1 | * | 3/2022 | | G06N 3/04 |
| WO | WO-2022048745 A1 | * | 3/2022 | | H04W 28/0263 |
| WO | WO-2022053148 A1 | * | 3/2022 | | H04L 41/044 |
| WO | WO-2022089724 A1 | * | 5/2022 | | H04L 63/10 |
| WO | WO-2022089725 A1 | * | 5/2022 | | H04L 41/0686 |
| WO | WO-2022141397 A1 | * | 7/2022 | | G06N 3/045 |
| WO | WO-2022160235 A1 | * | 8/2022 | | H04B 17/3913 |
| WO | WO-2022183471 A1 | * | 9/2022 | | H04B 7/0626 |
| WO | WO-2023070518 A1 | * | 5/2023 | | H04B 7/0469 |
| WO | WO-2024172918 A1 | * | 8/2024 | | H04B 7/0482 |

OTHER PUBLICATIONS

Supplementary European Search Report—EP21921841—Search Authority—Munich—Sep. 26, 2024.

* cited by examiner

Channel state information report 215

TECHNIQUES FOR DETERMINING CHANNEL STATE INFORMATION USING A NEURAL NETWORK MODEL

CROSS REFERENCE

The present application is a 371 national stage filing of International PCT Application No. PCT/CN2021/074347 by Li et al. entitled "TECHNIQUES FOR DETERMINING CHANNEL STATE INFORMATION USING A NEURAL NETWORK MODEL," filed Jan. 29, 2021, which is assigned to the assignee hereof, and which is expressly incorporated by reference in its entirety herein.

FIELD OF TECHNOLOGY

The following relates to wireless communications, including techniques for determining channel state information (CSI) using a neural network model.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a user equipment (UE) may be configured to perform a channel station information (CSI) determination procedure. As part of the CSI determination procedure the UE may receive, from a base station, one or more CSI reference signals (CSI-RS), where the UE may be configured to receive the one or more CSI-RSs associated with a set of CSI-RS antenna ports. The UE may measure the one or more CSI-RSs and transmit a CSI report to the base station, where the CSI report may be based on the measurements. Conventional methods for performing the CSI determination procedure may be improved.

SUMMARY

The described techniques relate to improved methods, systems, devices, and apparatuses that support techniques for determining channel state information (CSI) using a neural network model. Generally, the described techniques provide for enhanced methods for a user equipment (UE) to measure and report CSI. The UE may be configured to extrapolate, by using one or more neural networks, CSI for a set of antenna ports based on measurements made with regard to a subset of antenna ports of the set of antenna ports.

For example, a UE may receive a first indication of a first number of antenna ports for which the UE is to report CSI, and a second indication of a second number of antenna ports on which the UE is to measure CSI reference signals (CSI-RSs). The second number of antenna ports may be less than the first number of antenna ports. The UE may receive a third indication of one or more neural networks to be used by the UE for determination of the CSI associated with the first number of antenna ports. The UE may determine the CSI using the one or more neural networks and using measurements made by the UE on the second number of antenna ports as inputs to the one or more neural networks. The UE may transmit a report including the CSI associated with the first number of antenna ports determined via the one or more neural networks.

A method for wireless communications at a UE is described. The method may include receiving a first indication of a first number of antenna ports for which the UE is to report CSI, and a second indication of a second number of antenna ports on which the UE is to measure CSI-RSs, the second number of antenna ports being less than the first number of antenna ports, receiving a third indication of one or more neural networks to be used by the UE for determination of the CSI associated with the first number of antenna ports, determining the CSI using the one or more neural networks and using measurements made by the UE on the second number of antenna ports as inputs to the one or more neural networks, and transmitting a report including the CSI associated with the first number of antenna ports determined via the one or more neural networks.

An apparatus for wireless communications is described. The apparatus may include a processor, memory coupled with the processor, and instructions stored in the memory. The instructions may be executable by the processor to cause the apparatus to receive a first indication of a first number of antenna ports for which the UE is to report CSI, and a second indication of a second number of antenna ports on which the UE is to measure CSI-RSs, the second number of antenna ports being less than the first number of antenna ports, receive a third indication of one or more neural networks to be used by the UE for determination of the CSI associated with the first number of antenna ports, determine the CSI using the one or more neural networks and using measurements made by the UE on the second number of antenna ports as inputs to the one or more neural networks, and transmit a report including the CSI associated with the first number of antenna ports determined via the one or more neural networks.

Another apparatus for wireless communications at a UE is described. The apparatus may include means for receiving a first indication of a first number of antenna ports for which the UE is to report CSI, and a second indication of a second number of antenna ports on which the UE is to measure CSI-RSs, the second number of antenna ports being less than the first number of antenna ports, means for receiving a third indication of one or more neural networks to be used by the UE for determination of the CSI associated with the first number of antenna ports, means for determining the CSI using the one or more neural networks and using measurements made by the UE on the second number of antenna ports as inputs to the one or more neural networks, and means for transmitting a report including the CSI associated with the first number of antenna ports determined via the one or more neural networks.

A non-transitory computer-readable medium storing code for wireless communications at a UE is described. The code may include instructions executable by a processor to receive a first indication of a first number of antenna ports for which the UE is to report CSI, and a second indication of a second number of antenna ports on which the UE is to measure CSI-RSs, the second number of antenna ports being less than the first number of antenna ports, receive a third indication of one or more neural networks to be used by the UE for determination of the CSI associated with the first number of antenna ports, determine the CSI using the one or more neural networks and using measurements made by the UE on the second number of antenna ports as inputs to the one or more neural networks, and transmit a report including the CSI associated with the first number of antenna ports determined via the one or more neural networks.

In some examples of the method, apparatuses, and non-transitory computer-readable medium described herein, determining the CSI may include operations, features, means, or instructions for estimating a channel condition for each antenna port associated with the first number of antenna ports using the one or more neural networks and using the measurements made by the UE on the second number of antenna ports as inputs to the one or more neural networks.

Some examples of the method, apparatuses, and non-transitory computer-readable medium described herein may further include operations, features, means, or instructions for identifying one or more precoding matrix indicators (PMIs) for the first number of antenna ports based on the channel condition estimated for each antenna port associated with the first number of antenna ports.

In some examples of the method, apparatuses, and non-transitory computer-readable medium described herein, determining the CSI may include operations, features, means, or instructions for identifying one or more PMIs for the first number of antenna ports using the one or more neural networks and using the measurements made by the UE on the second number of antenna ports as inputs to the one or more neural networks.

Some examples of the method, apparatuses, and non-transitory computer-readable medium described herein may further include operations, features, means, or instructions for receiving a message indicating a precoding matrix codebook, the precoding matrix codebook configured for neural network based PMI identification, where the one or more PMIs may be identified from the precoding matrix codebook.

In some examples of the method, apparatuses, and non-transitory computer-readable medium described herein, receiving the message indicating the precoding matrix codebook may include operations, features, means, or instructions for receiving a CSI report configuration, the CSI report configuration including the precoding matrix codebook.

In some examples of the method, apparatuses, and non-transitory computer-readable medium described herein, receiving the message indicating the precoding matrix codebook may include operations, features, means, or instructions for receiving a trigger message triggering the UE to transmit the report including the CSI, the trigger message including the precoding matrix codebook.

In some examples of the method, apparatuses, and non-transitory computer-readable medium described herein, receiving the third indication of the one or more neural networks may include operations, features, means, or instructions for receiving one or more indices, each index of the one or more indices indicating a neural network to be used by the UE for determination of the CSI.

In some examples of the method, apparatuses, and non-transitory computer-readable medium described herein, receiving the third indication of the one or more neural networks may include operations, features, means, or instructions for receiving a message indicating a first antenna pattern associated with the first number of antenna ports, and indicating a second antenna pattern associated with the second number of antenna ports, where the second number of antenna ports with which the second antenna pattern may be associated may be a subset of the first number of antenna ports and identifying the one or more neural networks to be used by the UE for the determination of the CSI based on the first antenna pattern and the second antenna pattern.

In some examples of the method, apparatuses, and non-transitory computer-readable medium described herein, receiving the third indication of the one or more neural networks may include operations, features, means, or instructions for receiving a message indicating a first set of bases associated with the first number of antenna ports, and indicating a second set of bases associated with the second number of antenna ports, where the second number of antenna ports with which the second set of bases may be associated may be a subset of the first number of antenna ports and identifying the one or more neural networks to be used by the UE for the determination of the CSI based on the first set of bases and the second set of bases.

In some examples of the method, apparatuses, and non-transitory computer-readable medium described herein, receiving the third indication of the one or more neural networks may include operations, features, means, or instructions for receiving a CSI reporting configuration, the CSI reporting configuration including the third indication of the one or more neural networks.

In some examples of the method, apparatuses, and non-transitory computer-readable medium described herein, receiving the third indication of the one or more neural networks may include operations, features, means, or instructions for receiving a CSI resource configuration, the CSI resource configuration including the third indication of the one or more neural networks.

In some examples of the method, apparatuses, and non-transitory computer-readable medium described herein, receiving the second indication of the second number of antenna ports may include operations, features, means, or instructions for receiving a message indicating a set of neural networks to be used by the UE for determination of the second number of antenna ports, the set of neural networks including at least one neural network and determining the second number of antenna ports using the set of neural networks and using the first number of antenna ports as inputs to the set of neural networks.

Some examples of the method, apparatuses, and non-transitory computer-readable medium described herein may further include operations, features, means, or instructions for determining a preference of the UE to use the set of neural networks to determine the second number of antenna ports and transmitting a signal indicating the preference of the UE to use the set of neural networks, where receiving the message indicating the set of neural networks may be based on transmitting the signal indicating the preference.

Some examples of the method, apparatuses, and non-transitory computer-readable medium described herein may further include operations, features, means, or instructions for receiving a CSI-RS over each antenna port included in the first number of antenna ports and performing the measurements for each CSI-RS received via an antenna port included in the second number of antenna ports.

Some examples of the method, apparatuses, and non-transitory computer-readable medium described herein may further include operations, features, means, or instructions for receiving a CSI-RS over each antenna port included in the second number of antenna ports and performing the measurements for each received CSI-RS.

In some examples of the method, apparatuses, and non-transitory computer-readable medium described herein, a size of each neural network of the one or more neural networks may be based on the first number of antenna ports, the second number of antenna ports, a ratio between the first number of antenna ports and the second number of antenna ports, a pattern associated with the first number of antenna ports, or a pattern associated with the second number of antenna ports, or a combination thereof.

In some examples of the method, apparatuses, and non-transitory computer-readable medium described herein, the third indication includes the one or more neural networks based on a UE-specific configuration, a cell-specific configuration, or a group-specific configuration.

In some examples of the method, apparatuses, and non-transitory computer-readable medium described herein, the first indication of the first number of antenna ports identifies a first set of antenna ports including a quantity of antenna ports equal to the first number and the second indication of the second number of antenna ports identifies a second set of antenna ports including a quantity of antenna ports equal to the second number.

A method for wireless communications at a base station is described. The method may include transmitting a first indication of a first number of antenna ports for which a UE is to report CSI, and a second indication of a second number of antenna ports on which the UE is to measure CSI-RSs, the second number of antenna ports being less than the first number of antenna ports, transmitting a third indication of one or more neural networks to be used by the UE for determination of the CSI associated with the first number of antenna ports, and receiving a report including the CSI associated with the first number of antenna ports determined via the one or more neural networks.

An apparatus for wireless communications is described. The apparatus may include a processor, memory coupled with the processor, and instructions stored in the memory. The instructions may be executable by the processor to cause the apparatus to transmit a first indication of a first number of antenna ports for which a UE is to report CSI, and a second indication of a second number of antenna ports on which the UE is to measure CSI-RSs, the second number of antenna ports being less than the first number of antenna ports, transmit a third indication of one or more neural networks to be used by the UE for determination of the CSI associated with the first number of antenna ports, and receive a report including the CSI associated with the first number of antenna ports determined via the one or more neural networks.

Another apparatus for wireless communications at a base station is described. The apparatus may include means for transmitting a first indication of a first number of antenna ports for which a UE is to report CSI, and a second indication of a second number of antenna ports on which the UE is to measure CSI-RSs, the second number of antenna ports being less than the first number of antenna ports, means for transmitting a third indication of one or more neural networks to be used by the UE for determination of the CSI associated with the first number of antenna ports, and means for receiving a report including the CSI associated with the first number of antenna ports determined via the one or more neural networks.

A non-transitory computer-readable medium storing code for wireless communications at a base station is described. The code may include instructions executable by a processor to transmit a first indication of a first number of antenna ports for which a UE is to report CSI, and a second indication of a second number of antenna ports on which the UE is to measure CSI-RSs, the second number of antenna ports being less than the first number of antenna ports, transmit a third indication of one or more neural networks to be used by the UE for determination of the CSI associated with the first number of antenna ports, and receive a report including the CSI associated with the first number of antenna ports determined via the one or more neural networks.

Some examples of the method, apparatuses, and non-transitory computer-readable medium described herein may further include operations, features, means, or instructions for transmitting a message indicating a precoding matrix codebook, the precoding matrix codebook configured for neural network based PMI selection.

In some examples of the method, apparatuses, and non-transitory computer-readable medium described herein, transmitting the message indicating the precoding matrix codebook may include operations, features, means, or instructions for transmitting a CSI report configuration, the CSI report configuration including the precoding matrix codebook.

In some examples of the method, apparatuses, and non-transitory computer-readable medium described herein, transmitting the message indicating the precoding matrix codebook may include operations, features, means, or instructions for transmitting a trigger message triggering the UE to transmit the report including the CSI, the trigger message including the precoding matrix codebook.

In some examples of the method, apparatuses, and non-transitory computer-readable medium described herein, transmitting the third indication of the one or more neural networks may include operations, features, means, or instructions for transmitting one or more indices, each index of the one or more indices indicating a neural network to be used by the UE for determination of the CSI.

In some examples of the method, apparatuses, and non-transitory computer-readable medium described herein, transmitting the third indication of the one or more neural networks may include operations, features, means, or instructions for transmitting a message indicating of a first antenna pattern associated with the first number of antenna ports, and indicating a second antenna pattern associated with the second number of antenna ports, the first antenna pattern and the second antenna pattern indicating the one or more neural networks, where the second number of antenna ports with which the second antenna pattern may be associated may be a subset of the first number of antenna ports.

In some examples of the method, apparatuses, and non-transitory computer-readable medium described herein, transmitting the third indication of the one or more neural networks may include operations, features, means, or instructions for transmitting a message indicating a first set of bases associated with the first number of antenna ports, and indicating a second set of bases associated with the second number of antenna ports, the first set of bases and the second set of bases indicating the one or more neural networks, where the second number of antenna ports with which the second set of bases may be associated may be a subset of the first number of antenna ports.

In some examples of the method, apparatuses, and non-transitory computer-readable medium described herein, transmitting the second indication of the second number of antenna ports may include operations, features, means, or instructions for transmitting a message indicating a set of neural networks to be used by the UE for determination of the second number of antenna ports, the set of neural networks including at least one neural network.

Some examples of the method, apparatuses, and non-transitory computer-readable medium described herein may further include operations, features, means, or instructions for receiving a signal indicating a preference of the UE to use the set of neural networks, where transmitting the message indicating the set of neural networks may be based on receiving the signal indicating the preference.

DETAILED DESCRIPTION

Figure 1:
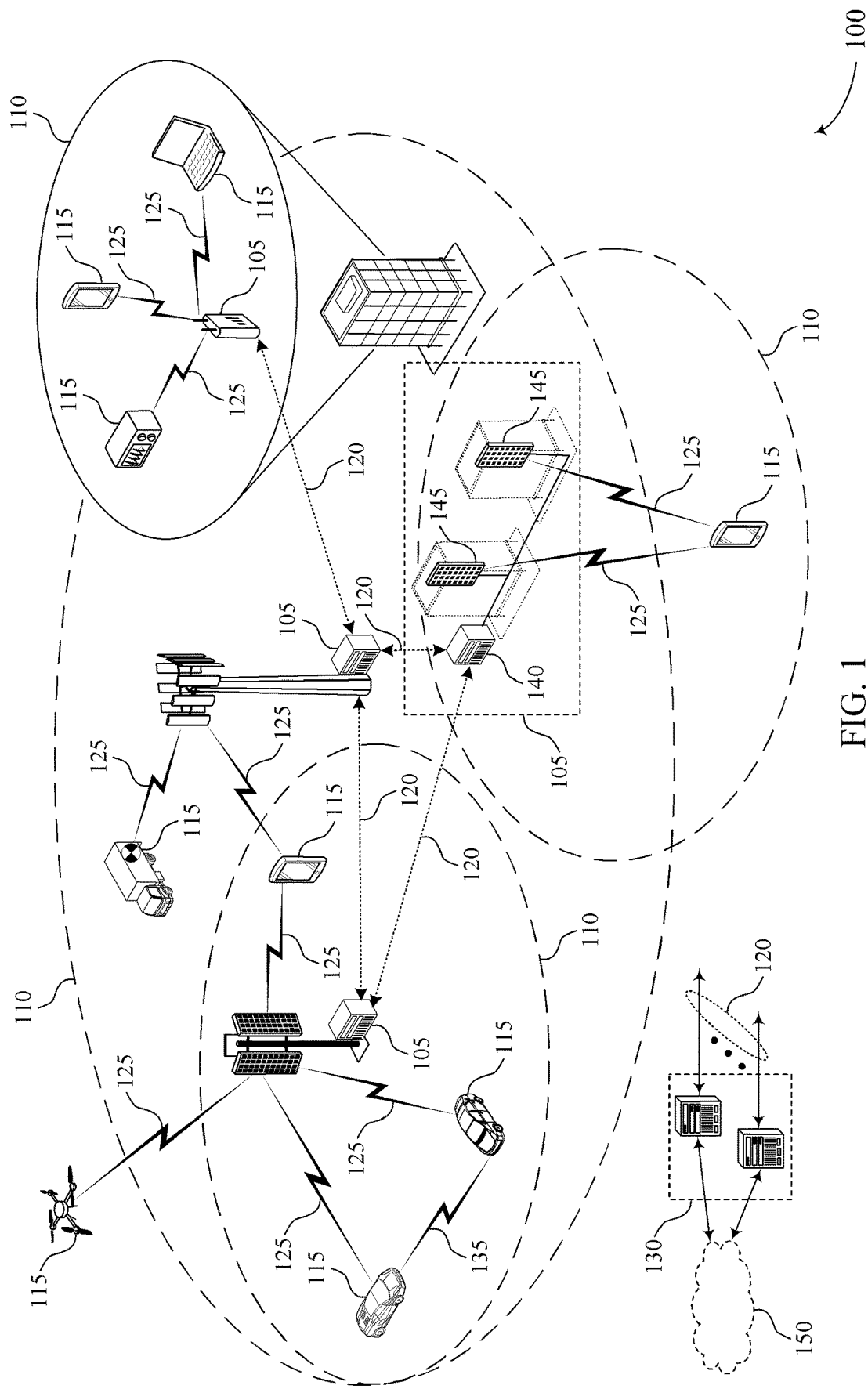
FIG. 1 illustrates an example of a wireless communications system that supports techniques for determining channel state information (CSI) using a neural network model in accordance with aspects of the present disclosure.

In some wireless communications systems, a UE may be configured, such as by a base station (or some other network device), to monitor for channel state information (CSI) reference signals (CSI-RS) associated with one or more CSI-RS antenna ports. As such, the base station may transmit a CSI-RS via one or more CSI-RS ports, and the UE may receive one or more CSI-RSs based on monitoring for the one or more CSI-RSs. The UE may be configured to perform measurements on each received CSI-RS to determine CSI associated with each received CSI-RS. In some cases, the UE may perform channel estimation for each received CSI-RS to determine CSI associated with the CSI-RS port over which the received CSI-RS was transmitted. In some cases, based on the channel estimation, the UE may determine one or more CSI parameters. For example, a CSI parameter may refer to a precoding matrix indicator (PMI), where a PMI may indicate a preferred precoder to be used for downlink transmissions from the base station to the UE.

The UE may be configured to transmit a CSI report indicating CSI for each CSI-RS port associated with a CSI-RS received by the UE. The UE may transmit a CSI report including an indication of the determined channel estimation for one or more the received CSI-RSs, and/or one or more of the determined CSI parameters. For example, the UE may include one or more PMIs in a CSI report, and the UE may transmit the CSI report to the base station. In some cases, a UE may be configured to monitor for CSI-RSs being transmitted from a large number of CSI-RS ports (e.g., 32 CSI-RS ports, 64 CSI-RS ports), and the UE may be configured to report a large number of CSI-RSs. As such, if the UE were configured to receive and measure a large number of CSI-RSs, and transmit a CSI report for a large number of CSI-RS ports, the power consumption of the UE, and the signaling overhead associated with the CSI report may increase as the number of CSI-RS ports increases.

Techniques described herein may enable a UE to extrapolate one or more channel parameters associated with a first set of CSI-RS ports (e.g., CSI-RS antenna ports, antenna ports, PMI antenna ports) based on performing CSI measurements on a second set of CSI-RS ports (e.g., CSI-RS antenna ports, antenna ports). The first set of CSI-RS ports may include a first number of CSI-RS ports, and the second set of CSI-RS ports may include a second number of CSI-RS ports, where the second number may be less than the first number. As such, the UE may receive a first indication of the first set of CSI-RS ports (e.g., first number of CSI-RS ports) for which the UE is to report CSI on. In some cases, the UE may receive a second indication of the second set of CSI-RS ports (e.g., second number of CSI-RS ports) on which the UE is to measure CSI-RSs. In some cases, the UE may determine the second set of CSI-RS ports based on the first set of CSI-RS ports.

The UE may receive an indication of one or more neural networks to be used by the UE for determining CSI for the first set of CSI-RS ports, based on the second set of CSI-RS ports. In some implementations, the UE may be configured to use the one or more neural networks to estimate the channel for each CSI-RS port included in the first set of CSI-RS ports, based on the second set of CSI-RS ports. In some cases, the UE may use the channel estimation for each CSI-RS port to determine one or more channel parameters, such as a PMI, for each CSI-RS port included in the first set of CSI-RS ports. In some implementations, the UE may be configured to use the one or more neural networks to determine (e.g., directly derive) the one or more channel parameters (e.g., PMI) for each CSI-RS port included in the first set of CSI-RS ports, based on the second set of CSI-RS ports. The UE may then transmit a CSI report indicating CSI, such as channel estimation information and/or channel parameters (e.g., PMI), for each CSI-RS port included in the first set of CSI-RS ports based on the UE performing measurements on the second set of CSI-RS ports.

Particular aspects of the subject matter described herein may be implemented to realize one or more advantages. The described techniques may support improvements in CSI measurement and reporting by decreasing signaling overhead, decreasing power consumption of a device (e.g., a UE), and decreasing latency among other advantages. As such, supported techniques may include improved network operations and, in some examples, may promote network efficiencies, among other benefits.

Aspects of the disclosure are initially described in the context of wireless communications systems. Aspects are then described with reference to examples of neural networks, and a process flow. Aspects of the disclosure are further illustrated by and described with reference to apparatus diagrams, system diagrams, and flowcharts that relate to techniques for determining CSI using a neural network model.

FIG. 1 illustrates an example of a wireless communications system 100 that supports techniques for determining CSI using a neural network model in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a LUE 115 receives and the higher the order of the modulation scheme, the higher the data rate may be for the LUE 115. A wireless communications resource may refer to a combination of a radio frequency spectrum resource, a time resource, and a spatial resource (e.g., spatial layers or beams), and the use of multiple spatial layers may further increase the data rate or data integrity for communications with a LUE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded. The UE 115 may provide feedback for beam selection, which may be a PMI or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

A UE 115 may receive, from a base station 105 (or some other network device), a first indication of a first number of antenna ports for which the UE 115 is to report CSI, and a second indication of a second number of antenna ports on which the UE 115 is to measure CSI-RSs. The second number of antenna ports may be less than the first number of antenna ports. The UE 115 may receive a third indication of one or more neural networks to be used by the UE 115 for determination of the CSI associated with the first number of antenna ports. The UE 115 may determine the CSI using the one or more neural networks and using measurements made by the UE 115 on the second number of antenna ports as inputs to the one or more neural networks. The UE 115 may transmit, to the base station 105 (or some other network device), a report including the CSI associated with the first number of antenna ports determined via the one or more neural networks. As such, the UE 115 may extrapolate, by using one or more neural networks, CSI for a set of antenna ports based on measurements made with regard to a subset of antenna ports of the set of antenna ports.

Figure 2:
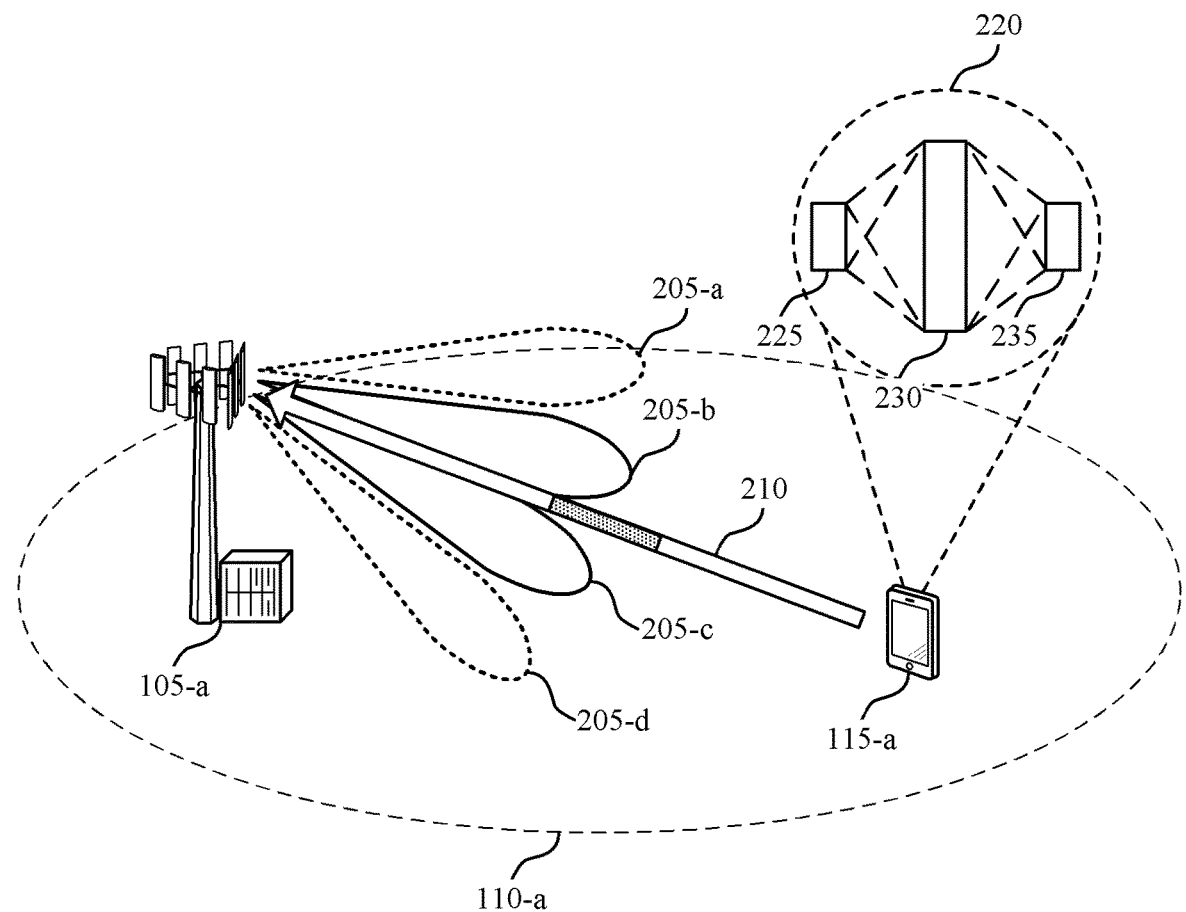
FIG. 2 illustrates an example of a wireless communications system that supports techniques for determining CSI using a neural network model in accordance with aspects of the present disclosure.
Figure 2:

FIG. 2 illustrates an example of a wireless communications system 200 that supports techniques for determining CSI using a neural network model in accordance with aspects of the present disclosure. The wireless communications system 200 may include base station 105-a and UE 115-a, which may be examples of a base station 105 and a UE 115 as described with reference to FIG. 1. Base station 105-a may serve a geographic coverage area 110-a. In some cases, UE 115-a may perform a channel measurement and reporting procedure, such as CSI measurement and reporting. Additionally or alternatively, other wireless devices, such as a base station 105, may implement a same or similar channel measurement and reporting procedure.

In some cases, a base station 105 and a UE 115 may support directional transmissions and may communicate via one or more directional beams. For example, base station 105-a and UE 115-a may communicate via transmit beams 205 or receive beams, or both, and may perform directional transmissions using a directional beam over a communication link 210. Further, the directional beams used by base station 105-a and UE 115-a may be associated with a channel or a medium between base station 105-a and UE 115-a. As such, base station 105-a and UE 115-a may communicate via the communication link 210 using one or more beams associated with one or more channels. In some aspects, the communication link 205 may be a line-of-sight link or involve a relatively small number of reflections (e.g., may be a non-line-of-sight link including one or more reflections).

In some cases, the radio environment between base station 105-a and UE 115-a may change, which may affect the quality of the beam or the channel, or both, used by base station 105-a and UE 115-a. For example, the UE 115-a may move (e.g., change physical location) or an object may become present between base station 105-a and UE 115-a, which may affect the signal strength or signal quality, or both, of transmissions between UE 115-a and base station 105-a. Additionally, in some systems that support relatively higher frequency communication, such as NR systems operating in FR2 radio frequency spectrum bands, a change in the radio environment between base station 105-a and UE 115-a may have a more pronounced influence on the quality of the beam or the channel. Further, in such systems supporting relatively higher frequency communication, changes in the radio environment between base station 105-a and UE 115-a may result in sudden changes (e.g., small time-scale changes) in the quality of the beam or the channel used by the base station 105-a and the UE 115-a. In some cases, such changes in the radio environment between base station 105-a and UE 115-a may decrease the likelihood for successful communication between base station 105-a and UE 115-a.

To maintain reliable communications between base station 105-a and UE 115-a, base station 105-a and UE 115-a may perform one or more beam management procedures. In some cases, based on performing a beam management procedure, base station 105-a may transmit one or more reference signals, such as CSI-RSs, SSBs, DMRSs, via one or more beams 205 (e.g., each CSI-RS may be transmitted by base station 105-a using a different directional beam) over a channel between base station 105-a and UE 115-a. In some cases, each beam 205 (each channel) may be associated with an antenna port. An antenna port may refer to a logical entity used to map data streams to antennas. A given antenna port may drive transmissions from one or more antennas (e.g., and resolve signal components received over one or more antennas). In some cases, each antenna port may be associated with a reference signal (e.g., which may allow the receiver to distinguish data streams associated with the different antenna ports in a received transmission). As such, each beam, and thus each channel, may be transmitted (e.g., formed) by an antenna port. In some cases, antenna ports may be configured for reference signal transmissions, where one or more antenna ports (e.g., one antenna port or greater, such as 2, 4, 8, 12, 16, 24, 32 antenna ports, or any number of antenna ports greater than 32, such 64) may be configured for CSI-RS transmissions by a base station 105. In some cases, transmissions via multiple antenna ports may be multiplexed such as by TDM, FDM or code division multiplexing (CDM).

A base station 105, or some other network device, may configure a UE 115 to monitor for CSI-RS transmissions from the base station 105, and to report CSI associated with any received CSI transmissions by the UE 115. For example, a UE 115 may receive a CSI report configuration (e.g., CSI-ReportConfig) that may indicate a number of CSI-RS antenna ports, a density (e.g., resource element (RE) density, physical resource block (PRB) density, or antenna port density, or a combination thereof), one or more multiplexing parameters (e.g., CDM length, CDM type), a location (e.g., time, frequency location) of the component RE patterns for the corresponding CSI-RS resource, or a scrambling ID, or a combination thereof. The UE 115 may receive the CSI report configuration periodically, semi-statically, or aperiodically, such as via a downlink control information (DCI), MAC control element (MAC-CE), or RRC message. In some cases, the UE 115 may receive a CSI resource configuration (e.g., CSI-ResourceConfig) that may indicate a set of CSI resources to be used for CSI-RS transmissions. For example, the CSI resource configuration may indicate that one or more NZP CSI-RS resources may be used for the transmissions of one or more CSI-RS transmissions. The UE 115 may receive the CSI report configuration periodically, semi-statically, or aperiodically, such as via a DCI, MAC-CE, or RRC message.

In some cases, the CSI report configuration, the CSI resource configuration, or some other message, may trigger the UE 115 to monitor for CSI-RS transmissions from the base station 105, based on the CSI report configuration and CSI resource configuration. Accordingly, the UE 115 may receive and perform CSI measurements for received CSI-RS transmissions, where each CSI-RS transmission may be transmitted via a different CSI-RS port. In some cases, the UE 115 may measure one or more parameters of the CSI-RS transmission such as signal quality (e.g., RSRQ), signal power (e.g., reference signal received power (RSRP)), a level of interference (e.g., signal to interference plus noise (SINR)), or a combination thereof. The UE 115 may measure a CSI-RS and may use the measurements to perform channel estimation, such as channel estimation of the channel associated with the CSI-RS port over which the CSI-RS was transmitted. The CSI-RS transmissions the UE 115 measures may be periodic CSI-RS transmissions, aperiodic CSI-RS transmissions, semi-persistent CSI-RS transmissions, or a combination. In some cases, the UE may determine one or more additional CSI parameters based on the channel estimation, such as rank indicators (RIs), PMIs, and/or channel quality indicators (CQIs). The UE 115 transmit a CSI report to the base station 105 including one or more parameters based on the CSI measurements. In some examples, the CSI report may include one or more PMIs, RIs, layer indicators (LIs), CQIs, RSRP measurements (such as Layer 1-RSRPs (L1-RSRPs)), SINR measurements (such as L1-SINRs), or the like. In some examples, the UE 115 may perform periodic CSI reporting (such as the base station 105 may transmit higher layer signaling scheduling periodic CSI reports), aperiodic CSI reporting (such that the base station 105 may dynamically configure a CSI report), semi-persistent CSI reporting (such that the base station 105 may transmit higher layer signaling scheduling periodic CSI reports and may use dynamic signaling to trigger the periodic CSI reporting), or a combination thereof. In some cases, as the number of CSI-RS ports the UE 115 is configured to receive CSI-RS transmissions from increases, and thus, as the number of CSI-RS transmissions to report on increases, the power consumption of the UE 115 may increase, and reporting overhead may increase.

To reduce power consumption and signaling overhead, UE 115-*a* may be configured to extrapolate one or more channel parameters associated with a first set of CSI-RS ports (e.g., CSI-RS antenna ports, antenna ports, PMI antenna ports) based on performing CSI measurements on a second set of CSI-RS ports (e.g., CSI-RS antenna ports, antenna ports). The first set of CSI-RS ports may include a first number of CSI-RS ports, and the second set of CSI-RS ports may include a second number of CSI-RS ports, where the second number may be less than the first number. As such, UE 115-*a* may receive, from base station 105-*a* or some other network device, a first indication of the first number of CSI-RS ports (e.g., first set of CSI-RS ports) for which UE 115-*a* is to report CSI on. In some cases, UE 115-*a* may receive a second indication of a second number of CSI-RS ports (e.g., second set of CSI-Rs ports) on which UE 115-*a* is to measure CSI-RSs on, where the second number may be less than the first number. The first indication and the second indication may be included in the same message, or a different message. For example, in some cases, the first indication and/or the second indication may be included in a CSI report configuration message (e.g., CSI-ReportConfig), or a CSI resource configuration message (e.g., CSI-ResourceConfig). In some cases, as described with reference to FIG. 3A, UE 115-*a* may determine the second number (e.g., the second set) of CSI-RS ports based on the first number (e.g., the first set) of CSI-RS ports.

UE 115-*a* may also receive a third indication of one or more neural networks 220 to be used by UE 115-*a* for determining CSI for the first number of CSI-RS ports, based on the second number of CSI-RS ports. The third indication of the one or more neural networks may be included in the same message as the first indication and/or the second indication, or may be included in a different message. For example, in some cases, the third indication may be included in a CSI report configuration message, or a CSI resource configuration message.

In some cases, the second number of CSI-RS ports may indicate a set of CSI-RS ports over which UE 115-*a* may receive a CSI-RS transmission. For example, UE 115-*a* may receive an indication or determine that the second number of CSI-RS ports may include a first CSI-RS port and a second CSI-RS port. The first CSI-RS port may be associated with beam 205-*b* (e.g., the first CSI-RS port forms beam 205-*b*, the first CSI-RS port transmits a CSI-RS via beam 205-*b*) and the second CSI-RS port may be associated with beam 205-*c* (e.g., the second CSI-RS port forms beam 205-*c*, the second CSI-RS port transmits a CSI-RS via beam 205-*c*). As such, UE 115-*a* may receive a CSI-RS transmission via beam 205-*b* and a CSI-RS transmission via beam 205-*c* (but not via beam 205-*a*, or beam 205-*d*). UE 115-*a* may perform one or more channel measurements on the CSI-RS transmissions received via beam 205-*b* and 205-*c*.

In some cases, the second number of CSI-RS ports may indicate a set of CSI-RS ports that the UE 115-*a* may measure a CSI-RS from. For example, UE 115-*a* may receive an indication or determine that the second number of CSI-RS ports may include a first CSI-RS port and a second CSI-RS port. The first CSI-RS port may be associated with beam 205-*b* and the second CSI-RS port may be associated with beam 205-*c*. In some cases, UE 115-*a* may receive a CSI-RS transmission via beam 205-*a*, a CSI-RS transmission via beam 205-*b*, a CSI-RS transmission via beam 205-*c*, or a CSI-RS transmission via beam 205-*d*, or a combination thereof. However, as the second set of CSI-RS ports indicated the first CSI-RS port associated with beam 205-*b* and the second CSI-RS port associated with beam 205-*c*, UE 115-*a* may perform one or more channel measurements on the CSI-RS transmissions received via beam 205-*b* and 205-*c* (but not via beam 205-*a*, or 205-*d*).

In either case, UE 115-*a* may perform CSI measurements associated with CSI-RS ports included in the second number of CSI-RS ports. UE 115-*a* may be configured to use the CSI measurements associated with the second number of CSI-RS ports to extrapolate CSI associated with the first number of CSI-RS ports. For example, UE 115-*a* may receive an indication that the first number of CSI-RS ports may include a first CSI-RS port associated with beam 205-*a*, a second CSI-RS port associated with beam 205-*b*, a third CSI-RS port associated with beam 205-*c*, and a fourth CSI-RS port associated with beam 205-*d*. As such, UE 115-*a* may be configured to determine CSI for a larger number of CSI-RS ports than the number of ports the UE 115-*a* performed a measurement on. UE 115-*a* may perform such an extrapolation via the one or more indicated neural networks 220.

A neural network 220 (e.g., neural network model) may utilize machine-learning to determine one or more outputs 235 based on one or more inputs 225. In some cases, the neural network 220, and/or one or more parameters of the neural network 220 may be preconfigured. In some cases, the one or more inputs 225 and/or the one or more outputs 235 associated with a neural network 220 may be preconfigured, where the inputs 225 and outputs 235 for one neural network 220 may be different than the inputs 225 and outputs 235 for another neural network 220. A neural network 220 may include a hidden layer 230 (including one or more intermediate layers). The hidden layer 230 of the neural network 220 may include one or more parameters configured by a base station 105, some other network device, or may be preconfigured. The hidden layer 430 may be in between input and output layers where artificial neurons consider a set of weighted inputs and produce an output through an activation function. For example, the one or more inputs 225 may be entered into the hidden layer 230, and the hidden layer may determine one or more outputs 235.

In some implementations, the one or more neural networks 220 may be configured to estimate the channel for each CSI-RS port included in the first number of CSI-RS ports (e.g., the one or more outputs 235), based on the second number of CSI-RS ports. For example, the one or more inputs 225 to the neural network 220 to estimate the channel for each CSI-RS port of the first number of CSI-RS ports may include the channel measurements, CSI parameters, etc. of the CSI-RS ports included in the second number of CSI-RS ports. In some cases, UE 115-*a* may use the channel estimation for each CSI-RS port of the first number of CSI-RS ports (e.g., the one or more outputs 235) to determine one or more channel parameters, such as a PMI, for each CSI-RS port included in the first number of CSI-RS ports.

In some implementations, the one or more neural networks 220 may be configured to determine (e.g., derive) the one or more channel parameters (e.g., PMI) for each CSI-RS port included in the first number of CSI-RS ports (e.g., the one or more outputs 235), based on the second number of CSI-RS ports. For example, the one or more inputs 225 to the neural network 220 to determine the one or more channel parameters for each CSI-RS port of the first number of CSI-RS ports may include the channel measurements, CSI parameters, etc. of the CSI-RS ports included in the second number of CSI-RS ports.

The UE may then transmit, to base station 105-*a*, a CSI report 215 via communications link 210 (e.g., an uplink communications link). The CSI report 215 may indicate CSI, such as channel estimation information and/or channel parameters (e.g., PMI) for each CSI-RS port included in the first number of CSI-RS ports based on UE 115-*a* performing measurements on the second number of CSI-RS ports, thereby reducing the overhead and power consumption associated with CSI-RS measurement and reporting.

Figure 3A:
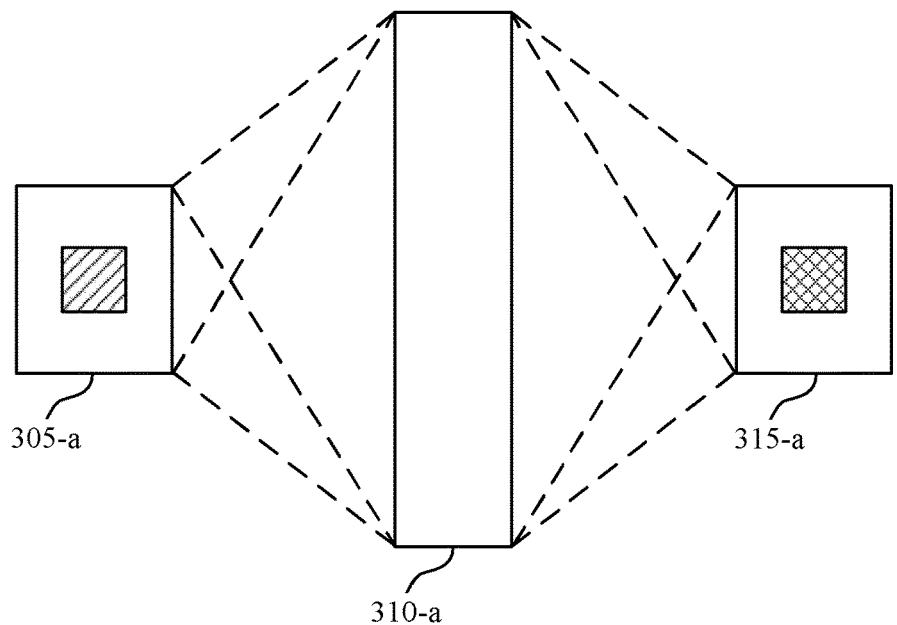
FIGS. 3A and 3B illustrate examples of neural networks that support techniques for determining CSI using a neural network model in accordance with aspects of the present disclosure.
Figure 3B:
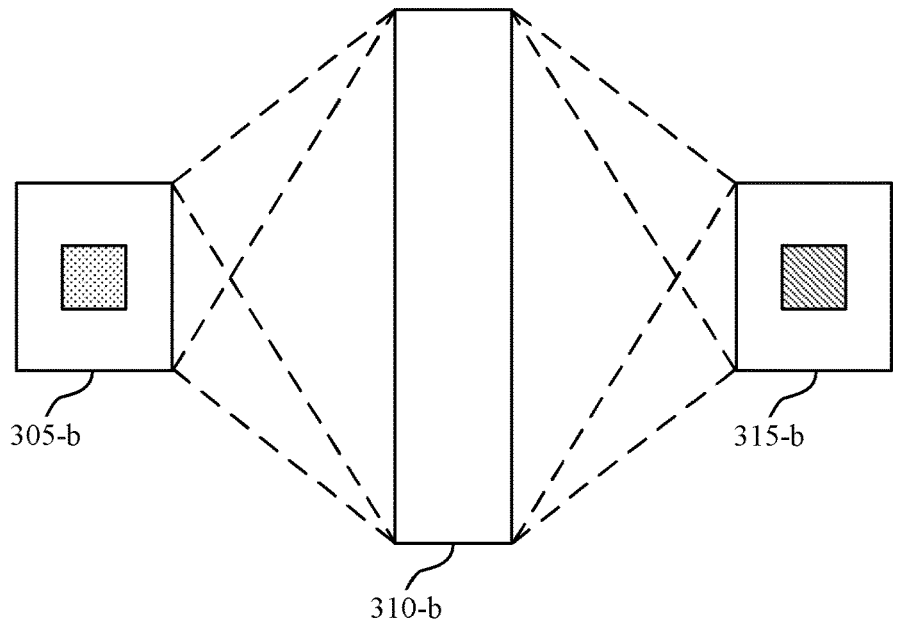

FIGS. 3A and 3B illustrate examples of neural networks 300 and 301, respectively, that support techniques for determining CSI using a neural network model in accordance with aspects of the present disclosure. Neural networks 300 and 301, or one or more parameters associated with neural networks 300 and 301 may be configured by a device such as a base station, or some other network device. A UE or base station, which may be examples of a base station and a UE as described with reference to FIG. 1, may be configured with the neural networks 300 and/or 301 to determine one or more outputs 315 based on one or more inputs 305. In some cases, a UE may use neural network 300 and/or 301 to perform a channel measurement and reporting procedure, such as CSI measurement and reporting. Additionally or alternatively, other wireless devices, such as a base station 105, may use neural network 300 and/or 301 to implement a same or similar channel measurement and reporting procedure.

As described with reference to FIG. 2, a UE may receive an indication of a first set of CSI-RS ports that the UE may be configured to transmit a CSI report on. In some cases, the UE may receive an indication of a second set of CSI-RS ports that the UE may be configured to perform CSI measurements on, where the first set of CSI-RS ports may include a greater number of CSI-RS ports than the second set of CSI-RS ports. With reference to FIG. 3A, in some cases, the UE may be receive an indication, or otherwise be configured with one or more neural networks, such as neural network 300, for the UE to use to determine the second set of CSI-RS ports, where the second set of CSI-RS ports may be a subset of CSI-RS ports included in first set of CSI-RS ports.

For example, the UE may receive an indication of the first number of CSI-RS ports (e.g., first set of CSI-RS ports) and receive an indication of, or otherwise be configured with neural network 300 and/or receive an indication of, or otherwise be configured with one or more parameters associated with neural network 300. For example, the UE may be configured with a lookup table or some other mapping that may include one or more neural networks and include an association of each neural network to an index or coefficient, or some other indicator. Then, the UE may receive an indication of the neural network 300, where the indication may be an index, coefficient, or some other indicator associated with the neural network 300. The UE may identify the indicator, and use the lookup table or mapping to determine the neural network 300, and/or the one or more parameters associated with the neural network 300 based on the indicator. In another example, the UE may receive the indication of the neural network 300 that includes one or more parameters associated with the neural network 300 or otherwise configures the UE with the neural network 300. In another example, the UE may be preconfigured with neural network 300. For example, the UE may receive the indication of the first number of CSI-RS ports where such an indication may prompt the UE to determine the second number of CSI-RS ports, or the UE may receive a message prompting the UE to determine the second number of CSI-RS ports. Upon receiving the prompt, the UE may identify the preconfigured neural network 300.

The one or more parameters associated with neural network 300 may be configured, such as by a base station or some other network device, or may be preconfigured. The one or more parameters may include one or more inputs 305-a, one or more parameters associated with the hidden layer 310-a (e.g., one or more intermediate layers), one or more outputs 315-a, the size of the neural network 300, a configuration of the neural network 300, etc. As such, upon identifying the neural network 300, the UE may determine that at least one of the inputs 305-a associated with the neural network 300 may be one or more parameters associated with the first number of antenna ports 320. For example, the one or more parameters associated with the first number of antenna ports 320 may include a quantity of CSI-RS ports included in the first number of antenna ports 320, and/or an identifier associated with each CSI-RS port included in the first number of antenna ports 320. As such, the UE may determine the one or more parameters associated with the first number of antenna ports 320 based on the received indication of the first number of antenna ports 320, and input the one or more parameters as an input 305-a to neural network 310-a. The hidden layer 310-a of the neural network may use the one or more parameters to determine one or more outputs 315-a. The one or more outputs 315-a may include one or more parameters associated with the second number of antenna ports 325. For example, the one or more parameters associated with the second number of antenna ports 325 may include a quantity of CSI-RS ports included in the second number of antenna ports 325, and/or an identifier associated with each CSI-RS port included in the second number of antenna ports 325. In some cases, the UE may receive an indication of the second number of antenna ports 325 and may be configured to determine the first number of antenna ports 320, such as by using a neural network.

In some implementations, the UE may determine a preference of the UE for selecting the second number of CSI-RS ports 325. The UE may prefer to receive an indication of the second number of antenna ports 325, such that the UE may not use a neural network to determine the second number of antenna ports 325. The UE may prefer to use a particular neural network for determining the second number of antenna ports 325, or prefer one or more parameters (e.g., input or output parameters). For example, the UE may prefer to determine the quantity of the second number of antenna ports 325, or to determine the second number of antenna ports 325 based on the quantity of the first number of antenna ports 320. The UE may transmit, to a base station or some other network device, a message including the preference of the UE. The base station, or network device, may identify the preference of the UE and may configure the UE to determine the second number of antenna ports 325 based on the preference of the UE. As such, the UE may determine the second set of antenna ports 325 based on neural network 300 or based on receiving an indication of the second set of antenna ports 325.

In some implementations, such as with reference to FIG. 3B, a UE may be configured to determine one or more channel parameters 335 associated with the first number of antenna ports for CSI reporting, where the UE may include the one or more channel parameters 335 in one or more CSI reports. The channel parameters 335 associated with the first number of antenna ports may be based on the second number of antenna ports. For example, the UE may receive an indication of the first number of antenna ports, and the UE may receive an indication or otherwise determine the second number of antenna ports. The UE may receive an indication, or otherwise be configured with one or more neural networks for determining the one or more channel parameters 335 associated with the first number of antenna ports. The indication of the first number of antenna ports, the indication of the second number of antenna ports (if the UE receives an indication of the second number of antenna ports), and the indication of the one or more neural networks (for channel parameter 335 determination as described with reference to FIG. 3B and/or for second number of antenna port 325 determination as described with reference to FIG. 3A) may be included in a message triggering the UE to perform CSI reporting, or included in a CSI configuration message, or both. For example, the one or more indications may be included in a CSI resource configuration message (e.g., CSI-ResourceConfig), and/or included in a CSI report configuration message (e.g., CSI-ReportConfig).

For example, the UE may receive an indication of, or otherwise be configured with neural network 301 and/or receive an indication of, or otherwise be configured with one or more parameters associated with neural network 301. In some cases, the UE may identify that neural network 301 is to be used for channel parameter 335 determination for the first number of antenna ports by an implicit indication or an explicit indication. For example, the UE may be configured with a lookup table or some other mapping that may include one or more neural networks and include an association of each neural network to an index or coefficient, or some other indicator. Then, an explicit indication may include the UE receiving an indication of the neural network 301, where the indication may be an index, coefficient, or some other indicator associated with the neural network 301. The UE may identify the indicator, and use the lookup table or mapping to determine the neural network 301, and/or the one or more parameters associated with the neural network 301 based on the indicator. In another example, the UE may receive the indication of the neural network 301 that includes one or more parameters associated with the neural network 301 or otherwise configures the UE with the neural network 301.

An implicit indication of neural network 301 may be based on antenna port patterns of the antenna ports over which the UE is configured to measure CSI, or antenna ports for which the UE is configured to report on. For example, the UE may be configured to receive CSI-RS transmissions from a base station, where the base station may transmit the CSI-RS transmissions via one or more antenna ports. The one or more antenna ports may be associated with an antenna port pattern that is related to a pattern of physical antennas in an antenna array at the base station. An antenna port pattern may include a number of active antenna elements, an identifier of the active antenna elements, the shape the antenna array (e.g., linear, rectangular), an inter-antenna element distance, etc. As such, the first number of antenna ports may be associated with a first antenna port pattern, and the second number of antenna ports may be associated with a second antenna port pattern. The second antenna port pattern may be a subset of the first antenna port pattern such that the pattern of the second number of antenna ports may be included in the pattern of the first number of antenna ports. An implicit indication of the neural network 301 may include the UE receiving an indication of the first antenna port, and/or the second antenna port pattern. The UE may be configured with a lookup table or mapping that includes an associated between the first and/or second antenna port patterns and a neural network. For example, the UE may receive an indication of the first antenna port pattern such as by a first indicator (e.g., index, coefficient) and/or receive an indication of the first antenna port pattern such as by a second indicator (e.g., index or coefficient). The UE may use the lookup table to identify a neural network to use for channel parameter 335 determination based on the first indicator and/or the second indicator.

An implicit indication of neural network 301 may be based on antenna port bases of the antenna ports over which the UE is configured to measure CSI, or antenna ports for which the UE is configured to report on. In some cases, a bases (e.g., a transfer domain bases) may be associated with (e.g., carried by) a respective antenna port, such that each antenna port included in the first number of antenna ports may be associated with a bases, and each antenna port included in the second number of antenna ports may be associated with a bases. As such, the first number of antenna ports may be associated with a first set of bases' (e.g., including one or more bases) and the second number of antenna ports may be associated with a second set of bases' (e.g., including one or more bases). The second set of bases' may be a subset of the first set of bases' such that the second set of bases' may be included in the first set of bases'. An implicit indication of the neural network 301 may include the UE receiving an indication of the bases (bases') associated with the first number of antenna ports, and/or indication of the bases (bases') associated with the second number of antenna ports. The UE may be configured with a lookup table or mapping that includes an association between the first set of bases' and/or the second set of bases' and a neural network. For example, the UE may receive an indication of one or more bases' included in the first set of bases' such as by one or more first indicators (e.g., indices, coefficients), and/or indication of one or more bases' included in the second set of bases' such as by one or more second indicators (e.g., indices, or coefficients). The UE may use the lookup table to identify a neural network to use for channel parameter 335 determination based on the one or more first indicators and/or the one or more second indicators.

In some implementations, the UE may be preconfigured with neural network 301. For example, the UE may receive the indication of the first number of CSI-RS ports where such an indication may prompt the UE to determine the one or more channel parameters 335 associated with the first number of antenna ports, or the UE may receive a message prompting the UE to determine the one or more channel parameters 335 associated with the first number of antenna ports. Upon receiving the prompt, the UE may identify the preconfigured neural network 301.

The one or more parameters associated with neural network 301 may be configured, such as by a base station or some other network device, or may be preconfigured. The one or more parameters may include one or more inputs 305-b, one or more parameters associated with the hidden layer 310-b, one or more outputs 315-b, the size of the neural network 301, a configuration of the neural network 301, etc. As such, upon identifying the neural network 301, the UE may determine that at least one of the inputs 305-a associated with the neural network 301 may be one or more CSI-RS measurements 330, such as CSI-RS measurements 330 associated with the second number of antenna ports. For example, the UE may identify the second number of antenna ports, where the UE may be configured to perform one or more CSI measurements 330 for each antenna port included in the second number of antenna ports. Such CSI measurements 330 may include a power measurement (e.g., RSRP), a quality measurement (e.g., RSRQ), an interference measurement (e.g., SINR), a channel estimation, or a combination thereof. As such, the UE may receive one or more reference signals via each antenna port included in the second number of antenna ports and perform CSI measurements 330 for each received reference signal associated with an antenna port included in the second number of antenna ports. The UE may use the CSI measurements 330 as at least one of the inputs 305-b to neural network 301 to determine one or more channel parameters 335 associated with the first number of antenna ports. For example, in some cases, the UE may be configured to input a channel estimation for each antenna port included in the second number of antenna ports. In another example, the UE may be configured to input an RSRP measurement for each antenna port included in the second number of antenna ports.

Neural network 301 may be configured to output channel parameters 335 associated with the first number of antenna ports. In some cases, the channel parameters 335 may include a channel estimation associated with each antenna port included in the first number of antenna ports. As such, the UE may input the CSI-RS measurements 330 associated with the second number of antenna ports into neural network 301, and neural network 301 may output a channel estimation for each antenna port included in the first number of antenna ports. In some cases, the UE may be configured to determine (with or without using a neural network) one or more CSI indicators based on the channel estimations, such as PMI, RI, CQI, etc. In some cases, the UE may identify the one or more CSI indicators, calculate the one or more CSI indicators, estimate the one or more CSI indicators, derive the one or more CSI indicators, etc. For example, the UE may identify the channel estimation for each antenna port included in the first number of antenna ports and determine one or more PMIs based on the channel estimation for each antenna port. The UE may determine one or more PMI codewords from a configured PMI codebook for the first number of antenna ports. In some cases, the UE may identify one CSI indicator (e.g., one PMI codeword) for the first number of antenna ports, or may identify multiple CSI indicators (e.g., multiple PMI codewords) for the first number of antenna ports. In some cases, the UE may identity one type of CSI indicator (e.g., PMI) for the first number of antenna ports, or may identify multiple types of CSI indicators (e.g., PMI and RI) for the first number of antenna ports.

In some cases, the channel parameters 335 may include one or more CSI indicators, such as PMI, RI, CQI, etc. As such, the UE may input the CSI-RS measurements 330 associated with the second number of antenna ports into neural network 301, and neural network 301 may output one or more CSI indicators associated with the first number of antenna ports. In some cases, the neural network may output one CSI indicator (e.g., one PMI codeword) for the first number of antenna ports, or may output multiple CSI indicators (e.g., multiple PMI codewords) for the first number of antenna ports. In some cases, the neural network may output one type of CSI indicator (e.g., PMI) for the first number of antenna ports, or may output multiple types of CSI indicators (e.g., PMI and RI) for the first number of antenna ports. For example, the neural network 301 may output one or more PMI codewords from a configured PMI codebook for the first number of antenna ports, where the configured PMI codebook may be configured for neural network based PMI selection. For example, the UE may be configured with a neural network PMI codebook via a configuration message, such as a codebook configuration message (e.g., CodebookConfig). Such codebook configuration message may be included in a report configuration message (e.g., CSI-ReportConfig), or may be included in a CSI reporting trigger message.

In some cases, the size of a neural network (e.g., neural network 300, neural network 301) including the input 305, the hidden layer 310, and the output 315 of the neural network, may be based the number of inputs, the number of outputs, a computation size, etc. For example, the size of neural network 301 may be based on a first quantity of antenna ports included in the first number of antenna ports, a second quantity of antenna ports included in the second number of antenna ports, the ratio between the first quantity and the second quantity, an antenna port pattern associated with the first number of antenna ports, an antenna port pattern associated with the second number of antenna ports, a bases (or bases') associated with the first number of antenna ports, a bases (or bases') associated with the second number of antenna ports, etc. In some implementations, neural network 300 and/or neural network 301 may be configured UE-specifically such that the UE-specific neural network may be based on one or more parameters of the UE, and may be indicated in a UE-specific message. In some implementations, neural network 300 and/or neural network 301 may be configured cell-specifically such that a cell-specific neural network may be based on one or more parameters of a cell, and may be indicated to one or more UEs in the cell via a cell-specific message. In some implementations, neural network 300 and/or neural network 301 may be configured group-specifically such that the group-specific neural network may be based on one or more parameters associated with a group of UEs, and may be indicated to the group of UEs via a group-specific message. In some implementations, a UE may obtain a neural network, whether it's a UE-specific, group-specific, or cell-specific neural network by downloading the neural network from a server, where the UE may receive an indication from a base station or some other network device to do so.

Neural networks 300 and 301 are examples of potential neural networks a UE may be configured to use for CSI reporting. A UE may be configured with any number of neural networks, and each neural network may have any number of inputs, any number of intermediate layers, and any number of outputs to be used by the UE for CSI reporting.

Figure 4:
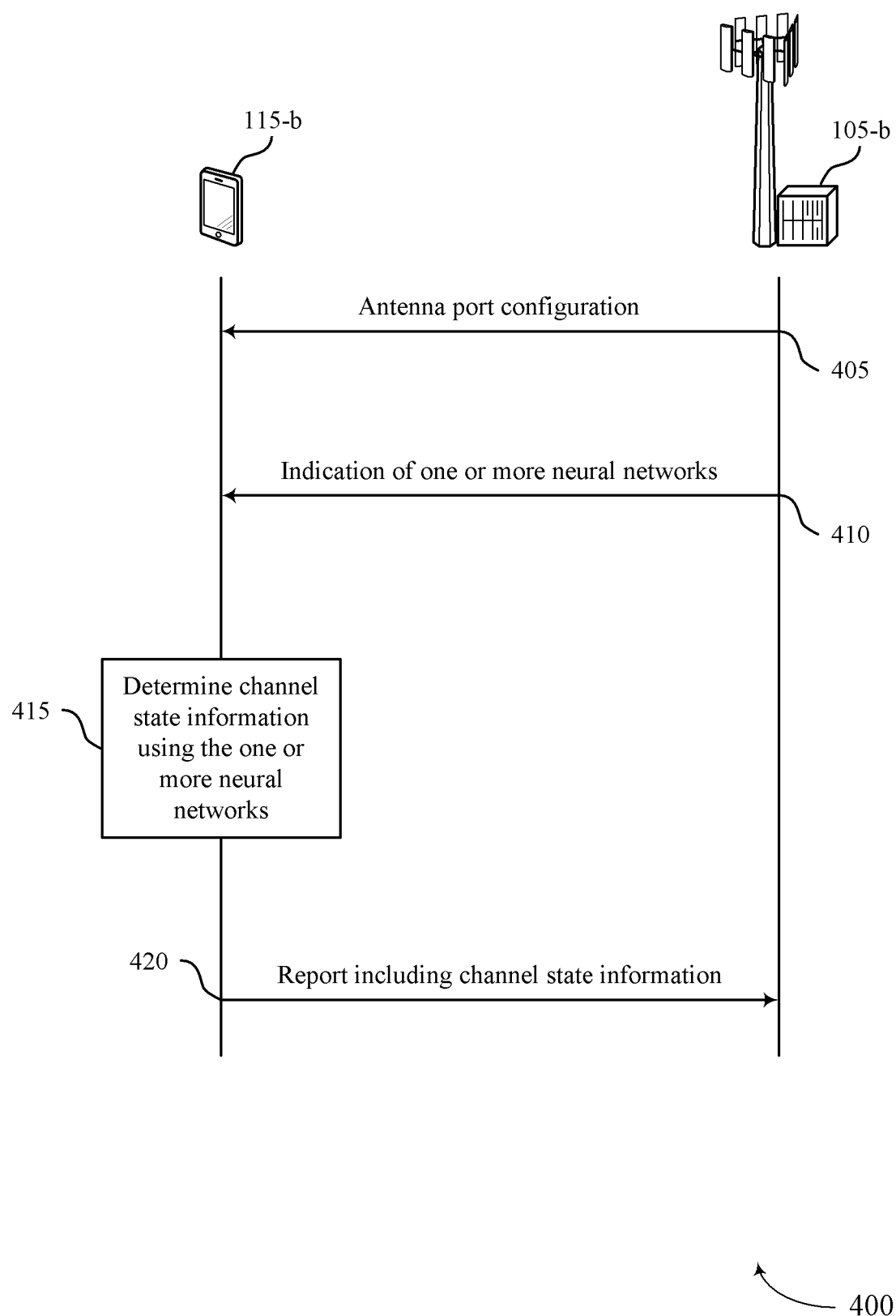
FIG. 4 illustrates an example of a process flow that supports techniques for determining CSI using a neural network model in accordance with aspects of the present disclosure.

FIG. 4 illustrates an example of a process flow 400 that supports techniques for determining CSI using a neural network model in accordance with aspects of the present disclosure. The process flow 400 may illustrate an example CSI reporting procedure. For example, UE 115-*b* may perform a CSI reporting procedure with base station 105-*b*. Base station 105-*b* and UE 115-*b* may be examples of the corresponding wireless devices described with reference to FIGS. 1 through 3 In some cases, instead of UE 115-*b* implementing the reporting procedure, a different type of wireless device (e.g., a base station 105) may perform a same or similar CSI reporting procedure. Alternative examples of the following may be implemented, where some steps are performed in a different order than described or are not performed at all. In some cases, steps may include additional features not mentioned below, or further steps may be added.

At 405, UE 115-*b* may receive, from base station 105-*b*, a first indication of a first number of antenna ports for which UE 115-*b* is to report CSI. UE 115-*b* may receive, from base station 105-*b*, a second indication of a second number of antenna ports on which UE 115-*b* is to measure CSI-RSs, where the second number of antenna ports may be less than the first number of antenna ports. The first indication of the first number of antenna ports may identify a first set of antenna ports including a quantity of antenna ports equal to the first number and the second indication of the second number of antenna ports may identify a second set of antenna ports including a quantity of antenna ports equal to the second number.

In some implementations, UE 115-*b* may receive a message indicating a set of neural networks to be used by UE 115-*b* for determination of the second number of antenna ports, where the set of neural networks may include at least one neural network. UE 115-*b* may determine the second number of antenna ports using the set of neural networks and using the first number of antenna ports as inputs to the set of neural networks. In some cases, UE 115-*b* may determine a preference of UE 115-*b* to use the set of neural networks to determine the second number of antenna ports, and UE 115-*b* may transmit, such as to base station 105-*b*, a signal indicating the preference of UE 115-*b* to use the set of neural networks, where receiving the message indicating the set of neural networks is based at least in part on transmitting the signal indicating the preference.

At 410, UE 115-*b* may receive, from base station 105-*b*, a third indication of one or more neural networks to be used by UE 115-*b* for determination of the CSI associated with the first number of antenna ports. The third indication may include the one or more neural networks based at least in part on a UE-specific configuration, a cell-specific configuration, or a group-specific configuration. In some cases, UE 115-*b* may receive one or more indices, where each index of the one or more indices may indicate a neural network to be used by UE 115-*b* for determination of the CSI. UE 115-*b* may receive a CSI reporting configuration, where the CSI reporting configuration may include the third indication of the one or more neural networks. UE 115-*b* may receive a CSI resource configuration, where the CSI resource configuration may include the third indication of the one or more neural networks.

In some implementations, UE 115-*b* may receive a message indicating a first antenna pattern associated with the first number of antenna ports, and indicating a second antenna pattern associated with the second number of antenna ports, where the second number of antenna ports with which the second antenna pattern is associated may be a subset of the first number of antenna ports. UE 115-*b* may identify the one or more neural networks to be used by UE 115-*b* for the determination of the CSI based at least in part on the first antenna pattern and the second antenna pattern.

In some implementations, UE 115-*b* may receive a message indicating a first set of bases associated with the first number of antenna ports, and indicating a second set of bases associated with the second number of antenna ports, where the second number of antenna ports with which the second set of bases are associated may be a subset of the first number of antenna ports. UE 115-*b* may identify the one or more neural networks to be used by UE 115-*b* for the determination of the CSI based at least in part on the first set of bases and the second set of bases.

In some cases, a size of each neural network of the one or more neural networks may be based at least in part on the first number of antenna ports, the second number of antenna ports, a ratio between the first number of antenna ports and the second number of antenna ports, a pattern associated with the first number of antenna ports, or a pattern associated with the second number of antenna ports, or a combination thereof.

In some cases, UE 115-*b* may receive a CSI-RS over each antenna port included in the first number of antenna ports, and UE 115-*b* may perform the measurements for each CSI-RS received via an antenna port included in the second number of antenna ports. In some cases, UE 115-*b* may receive a CSI-RS over each antenna port included in the second number of antenna ports, and UE 115-*b* may perform the measurements for each received CSI-RS.

At 415, UE 115-*b* may determine the CSI using the one or more neural networks and using measurements made by UE 115-*b* on the second number of antenna ports as inputs to the one or more neural networks. In some implementations, UE 115-*b* may estimate a channel condition for each antenna port associated with the first number of antenna ports using the one or more neural networks and using the measurements made by UE 115-*b* on the second number of antenna ports as inputs to the one or more neural networks. UE 115-*b* may identify one or more PMIs for the first number of antenna ports based at least in part on the channel condition estimated for each antenna port associated with the first number of antenna ports.

In some implementations, UE 115-*b* may identify one or more PMIs for the first number of antenna ports using the one or more neural networks and using the measurements made by the UE on the second number of antenna ports as inputs to the one or more neural networks. In some cases, prior to identifying one or more PMIs, UE 115-*b* may receive a message indicating a precoding matrix codebook. The precoding matrix codebook may be configured for neural network based PMI identification, where the one or more PMIs are identified from the precoding matrix codebook. In some cases, UE 115-*b* may receive a CSI report configuration, where the CSI report configuration includes the precoding matrix codebook. In some cases, UE 115-*b* may receive a trigger message triggering UE 115-*b* to transmit the report including the CSI, where the trigger message includes the precoding matrix codebook.

At 420, UE 115-*b* may transmit a report including the CSI associated with the first number of antenna ports determined via the one or more neural networks.

Figure 5:
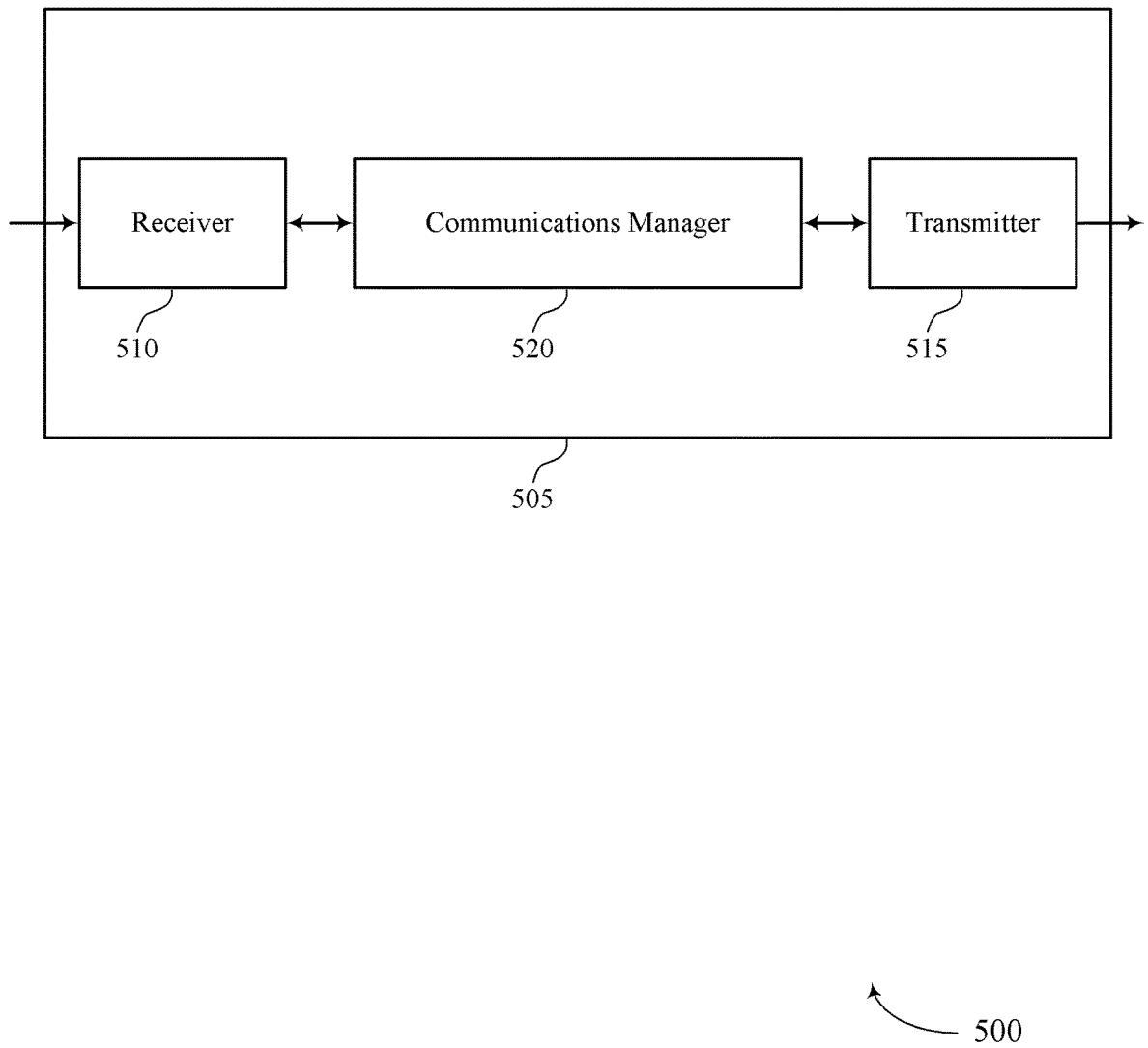
FIGS. 5 and 6 show block diagrams of devices that support techniques for determining CSI using a neural network model in accordance with aspects of the present disclosure.

FIG. 5 shows a block diagram 500 of a device 505 that supports techniques for determining CSI using a neural network model in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for determining CSI using a neural network model). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for determining CSI using a neural network model). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for determining CSI using a neural network model as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving a first indication of a first number of antenna ports for which the UE is to report CSI, and a second indication of a second number of antenna ports on which the UE is to measure CSI-RSs, the second number of antenna ports being less than the first number of antenna ports. The communications manager 520 may be configured as or otherwise support a means for receiving a third indication of one or more neural networks to be used by the UE for determination of the CSI associated with the first number of antenna ports. The communications manager 520 may be configured as or otherwise support a means for determining the CSI using the one or more neural networks and using measurements made by the UE on the second number of antenna ports as inputs to the one or more neural networks. The communications manager 520 may be configured as or otherwise support a means for transmitting a report including the CSI associated with the first number of antenna ports determined via the one or more neural networks.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced signaling overhead, and more efficient utilization of communication resources.

Figure 6:
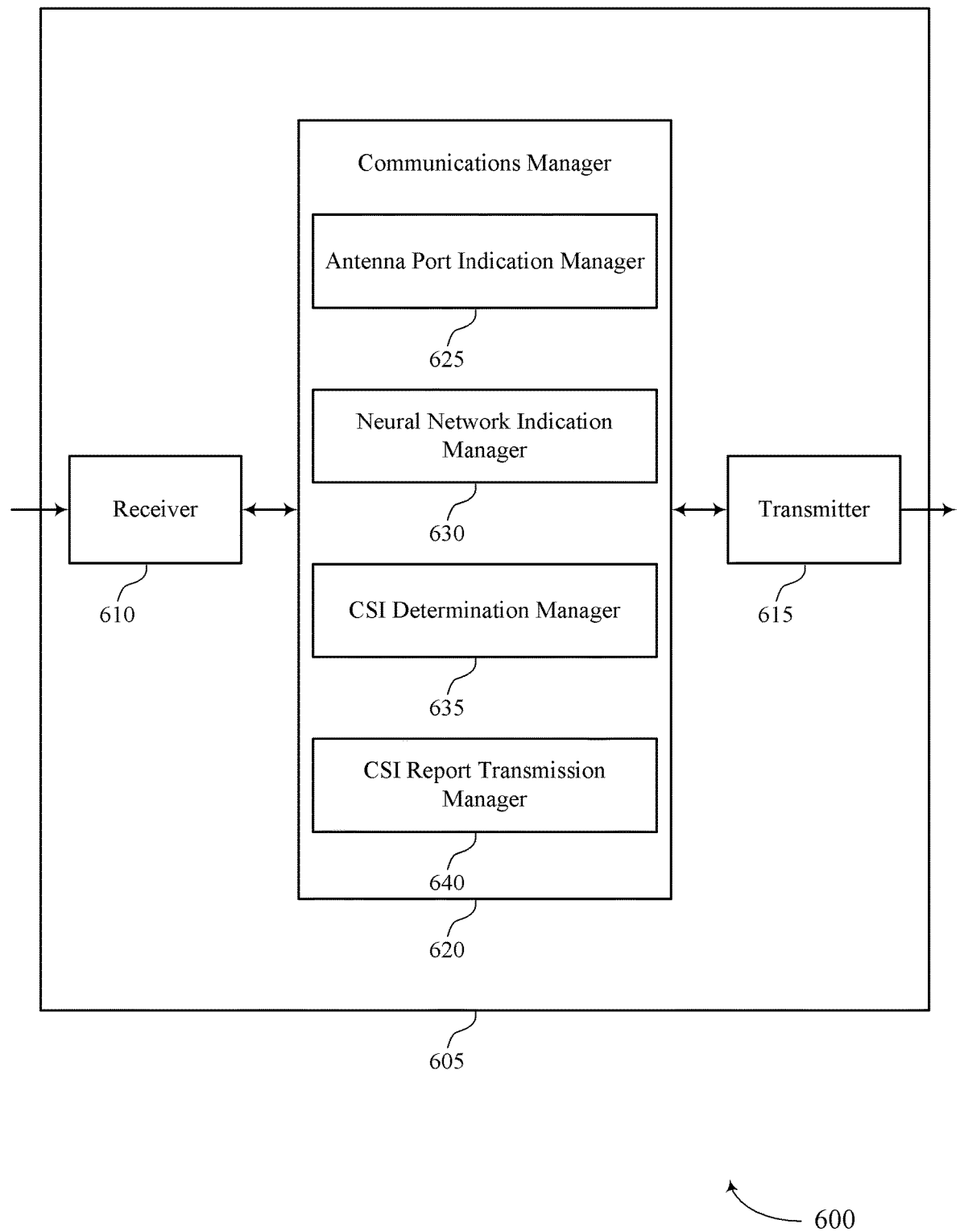

FIG. 6 shows a block diagram 600 of a device 605 that supports techniques for determining CSI using a neural network model in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for determining CSI using a neural network model). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for determining CSI using a neural network model). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for determining CSI using a neural network model as described herein. For example, the communications manager 620 may include an antenna port indication manager 625, a neural network indication manager 630, a CSI determination manager 635, a CSI report transmission manager 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The antenna port indication manager 625 may be configured as or otherwise support a means for receiving a first indication of a first number of antenna ports for which the UE is to report CSI, and a second indication of a second number of antenna ports on which the UE is to measure CSI-RSs, the second number of antenna ports being less than the first number of antenna ports. The neural network indication manager 630 may be configured as or otherwise support a means for receiving a third indication of one or more neural networks to be used by the UE for determination of the CSI associated with the first number of antenna ports. The CSI determination manager 635 may be configured as or otherwise support a means for determining the CSI using the one or more neural networks and using measurements made by the UE on the second number of antenna ports as inputs to the one or more neural networks. The CSI report transmission manager 640 may be configured as or otherwise support a means for transmitting a report including the CSI associated with the first number of antenna ports determined via the one or more neural networks.

Figure 7:
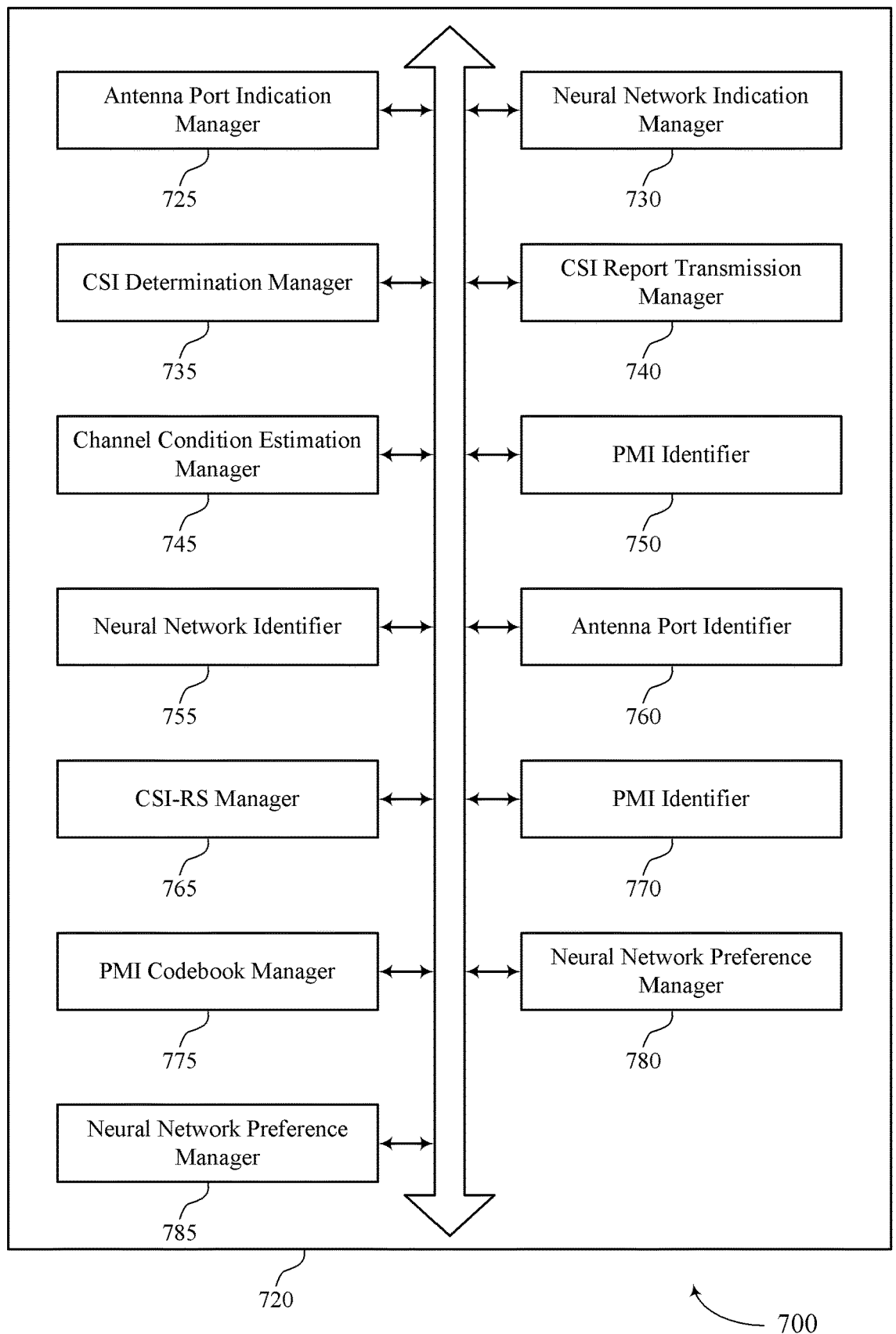
FIG. 7 shows a block diagram of a communications manager that supports techniques for determining CSI using a neural network model in accordance with aspects of the present disclosure.

FIG. 7 shows a block diagram 700 of a communications manager 720 that supports techniques for determining CSI using a neural network model in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for determining CSI using a neural network model as described herein. For example, the communications manager 720 may include an antenna port indication manager 725, a neural network indication manager 730, a CSI determination manager 735, a CSI report transmission manager 740, a channel condition estimation manager 745, a PMI identifier 750, a neural network identifier 755, an antenna port identifier 760, a CSI-RS manager 765, a PMI identifier 770, a PMI codebook manager 775, a neural network preference manager 780, a neural network preference manager 785, or any combination thereof. Each of these components may communicate, directly or indirectly, with one another (e.g., via one or more buses).

The communications manager 720 may support wireless communications at a UE in accordance with examples as disclosed herein. The antenna port indication manager 725 may be configured as or otherwise support a means for receiving a first indication of a first number of antenna ports for which the UE is to report CSI, and a second indication of a second number of antenna ports on which the UE is to measure CSI-RSs, the second number of antenna ports being less than the first number of antenna ports. The neural network indication manager 730 may be configured as or otherwise support a means for receiving a third indication of one or more neural networks to be used by the UE for determination of the CSI associated with the first number of antenna ports. The CSI determination manager 735 may be configured as or otherwise support a means for determining the CSI using the one or more neural networks and using measurements made by the UE on the second number of antenna ports as inputs to the one or more neural networks. The CSI report transmission manager 740 may be configured as or otherwise support a means for transmitting a report including the CSI associated with the first number of antenna ports determined via the one or more neural networks.

In some examples, to support determining the CSI, the channel condition estimation manager 745 may be configured as or otherwise support a means for estimating a channel condition for each antenna port associated with the first number of antenna ports using the one or more neural networks and using the measurements made by the UE on the second number of antenna ports as inputs to the one or more neural networks.

In some examples, the PMI identifier 770 may be configured as or otherwise support a means for identifying one or more PMIs for the first number of antenna ports based on the channel condition estimated for each antenna port associated with the first number of antenna ports.

In some examples, to support determining the CSI, the PMI identifier 750 may be configured as or otherwise support a means for identifying one or more PMIs for the first number of antenna ports using the one or more neural networks and using the measurements made by the UE on the second number of antenna ports as inputs to the one or more neural networks.

In some examples, the PMI codebook manager 775 may be configured as or otherwise support a means for receiving a message indicating a precoding matrix codebook, the precoding matrix codebook configured for neural network based PMI identification, where the one or more PMIs are identified from the precoding matrix codebook.

In some examples, to support receiving the message indicating the precoding matrix codebook, the PMI codebook manager 775 may be configured as or otherwise support a means for receiving a CSI report configuration, the CSI report configuration including the precoding matrix codebook.

In some examples, to support receiving the message indicating the precoding matrix codebook, the PMI codebook manager 775 may be configured as or otherwise support a means for receiving a trigger message triggering the UE to transmit the report including the CSI, the trigger message including the precoding matrix codebook.

In some examples, to support receiving the third indication of the one or more neural networks, the neural network indication manager 730 may be configured as or otherwise support a means for receiving one or more indices, each index of the one or more indices indicating a neural network to be used by the UE for determination of the CSI.

In some examples, to support receiving the third indication of the one or more neural networks, the antenna port indication manager 725 may be configured as or otherwise support a means for receiving a message indicating a first antenna pattern associated with the first number of antenna ports, and indicating a second antenna pattern associated with the second number of antenna ports, where the second number of antenna ports with which the second antenna pattern is associated is a subset of the first number of antenna ports. In some examples, to support receiving the third indication of the one or more neural networks, the neural network identifier 755 may be configured as or otherwise support a means for identifying the one or more neural networks to be used by the UE for the determination of the CSI based on the first antenna pattern and the second antenna pattern.

In some examples, to support receiving the third indication of the one or more neural networks, the antenna port indication manager 725 may be configured as or otherwise support a means for receiving a message indicating a first set of bases associated with the first number of antenna ports, and indicating a second set of bases associated with the second number of antenna ports, where the second number of antenna ports with which the second set of bases are associated is a subset of the first number of antenna ports. In some examples, to support receiving the third indication of the one or more neural networks, the neural network identifier 755 may be configured as or otherwise support a means for identifying the one or more neural networks to be used by the UE for the determination of the CSI based on the first set of bases and the second set of bases.

In some examples, to support receiving the third indication of the one or more neural networks, the neural network indication manager 730 may be configured as or otherwise support a means for receiving a CSI reporting configuration, the CSI reporting configuration including the third indication of the one or more neural networks.

In some examples, to support receiving the third indication of the one or more neural networks, the neural network indication manager 730 may be configured as or otherwise support a means for receiving a CSI resource configuration, the CSI resource configuration including the third indication of the one or more neural networks.

In some examples, to support receiving the second indication of the second number of antenna ports, the neural network indication manager 730 may be configured as or otherwise support a means for receiving a message indicating a set of neural networks to be used by the UE for determination of the second number of antenna ports, the set of neural networks including at least one neural network. In some examples, to support receiving the second indication of the second number of antenna ports, the antenna port identifier 760 may be configured as or otherwise support a means for determining the second number of antenna ports using the set of neural networks and using the first number of antenna ports as inputs to the set of neural networks.

In some examples, the neural network preference manager 780 may be configured as or otherwise support a means for determining a preference of the UE to use the set of neural networks to determine the second number of antenna ports. In some examples, the neural network preference manager 785 may be configured as or otherwise support a means for transmitting a signal indicating the preference of the UE to use the set of neural networks, where receiving the message indicating the set of neural networks is based on transmitting the signal indicating the preference.

In some examples, the CSI-RS manager 765 may be configured as or otherwise support a means for receiving a CSI-RS over each antenna port included in the first number of antenna ports. In some examples, the CSI-RS manager 765 may be configured as or otherwise support a means for performing the measurements for each CSI-RS received via an antenna port included in the second number of antenna ports.

In some examples, the CSI-RS manager 765 may be configured as or otherwise support a means for receiving a CSI-RS over each antenna port included in the second number of antenna ports. In some examples, the CSI-RS manager 765 may be configured as or otherwise support a means for performing the measurements for each received CSI-RS.

In some examples, a size of each neural network of the one or more neural networks is based on the first number of antenna ports, the second number of antenna ports, a ratio between the first number of antenna ports and the second number of antenna ports, a pattern associated with the first number of antenna ports, or a pattern associated with the second number of antenna ports, or a combination thereof.

In some examples, the third indication includes the one or more neural networks based on a UE-specific configuration, a cell-specific configuration, or a group-specific configuration.

In some examples, the first indication of the first number of antenna ports identifies a first set of antenna ports including a quantity of antenna ports equal to the first number and the second indication of the second number of antenna ports identifies a second set of antenna ports including a quantity of antenna ports equal to the second number.

Figure 8:
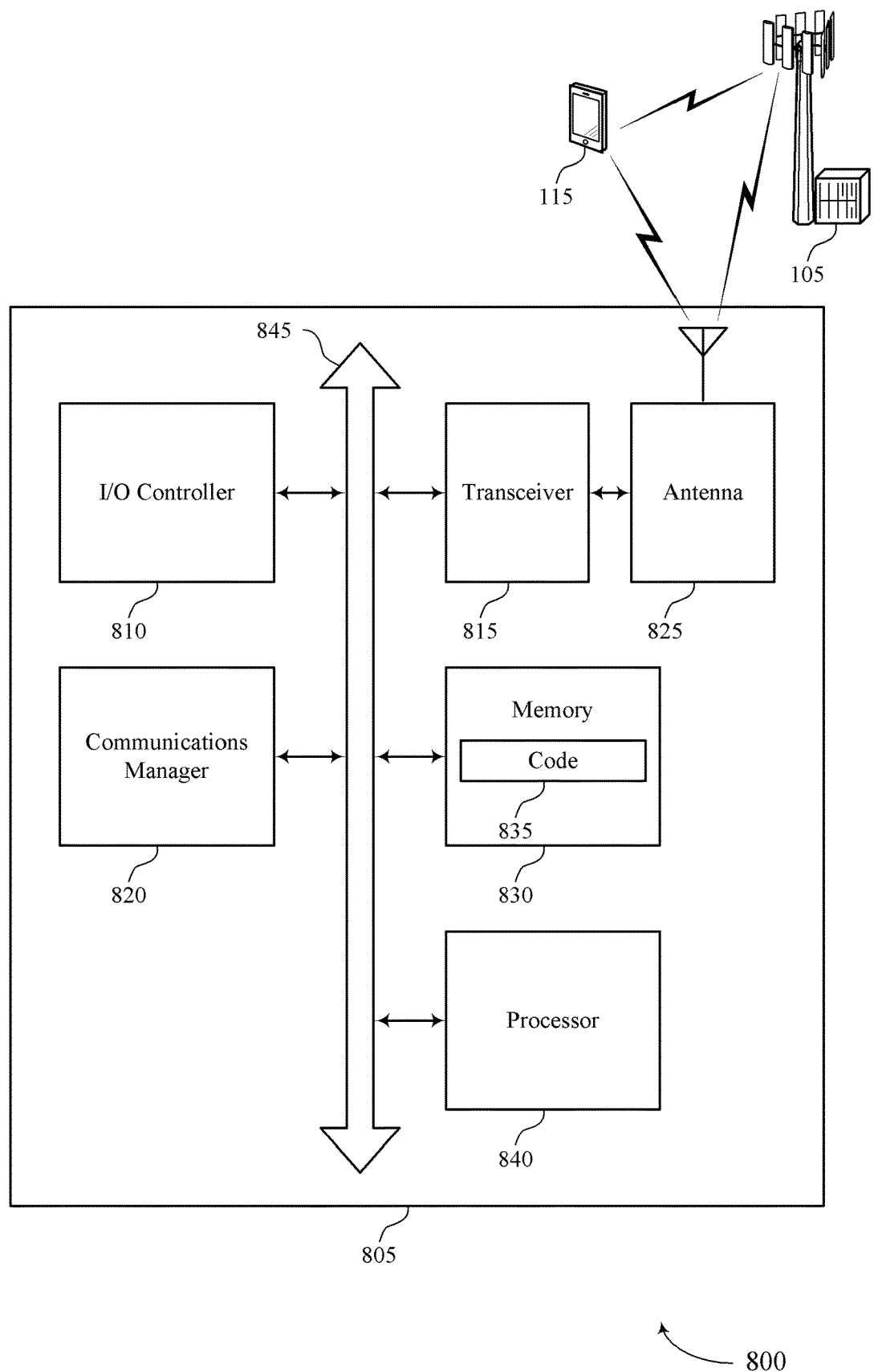
FIG. 8 shows a diagram of a system including a device that supports techniques for determining CSI using a neural network model in accordance with aspects of the present disclosure.

FIG. 8 shows a diagram of a system 800 including a device 805 that supports techniques for determining CSI using a neural network model in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for determining CSI using a neural network model). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving a first indication of a first number of antenna ports for which the UE is to report CSI, and a second indication of a second number of antenna ports on which the UE is to measure CSI-RSs, the second number of antenna ports being less than the first number of antenna ports. The communications manager 820 may be configured as or otherwise support a means for receiving a third indication of one or more neural networks to be used by the UE for determination of the CSI associated with the first number of antenna ports. The communications manager 820 may be configured as or otherwise support a means for determining the CSI using the one or more neural networks and using measurements made by the UE on the second number of antenna ports as inputs to the one or more neural networks. The communications manager 820 may be configured as or otherwise support a means for transmitting a report including the CSI associated with the first number of antenna ports determined via the one or more neural networks.

By including or configuring the communications manager 820 in accordance with examples as described herein, the device 805 may support techniques for reduced latency, improved user experience related to reduced processing, reduced signaling overhead, and more efficient utilization of communication resources.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for determining CSI using a neural network model as described herein, or the processor 840 and the memory 830 may be otherwise configured to perform or support such operations.

Figure 9:
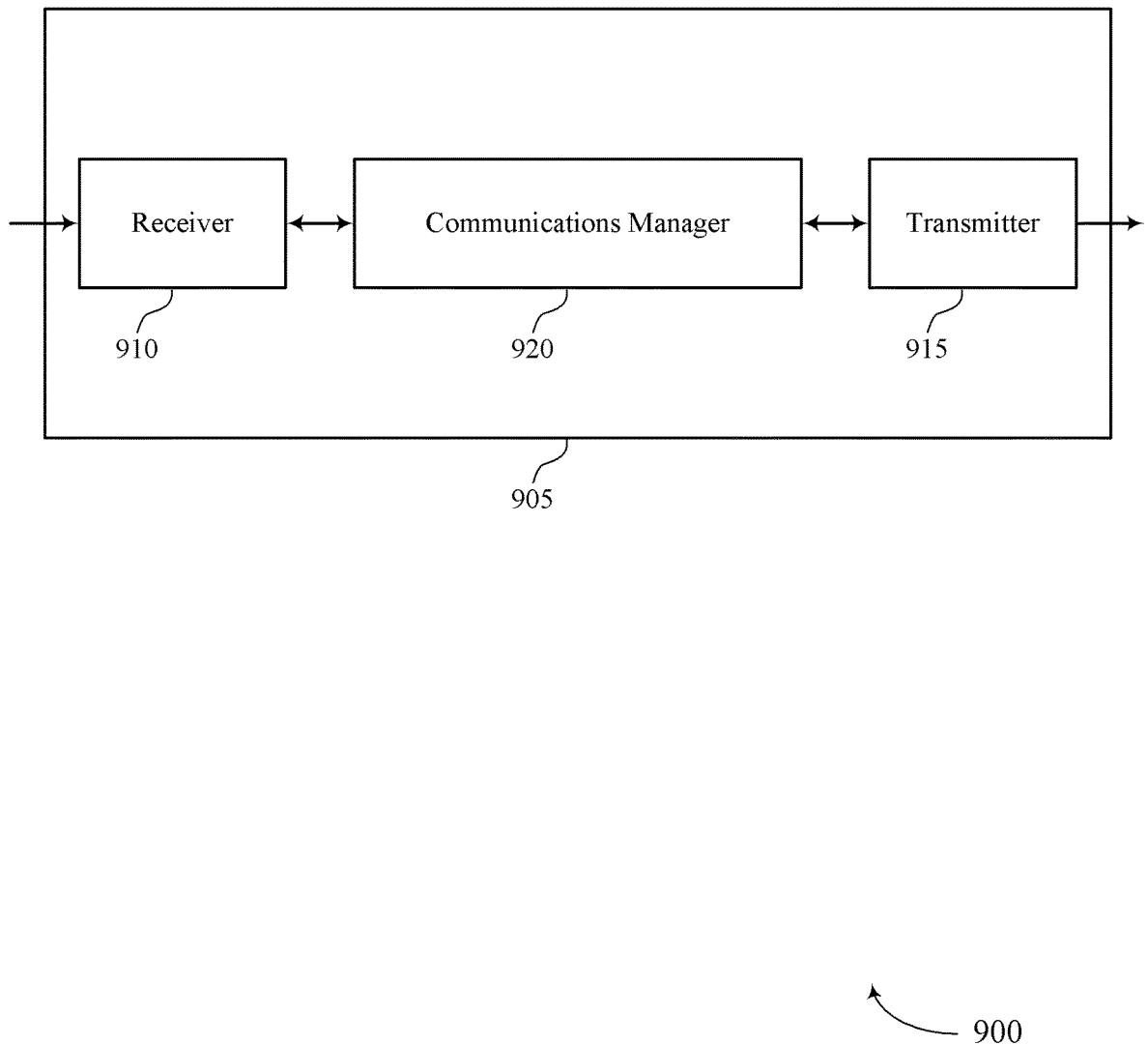
FIGS. 9 and 10 show block diagrams of devices that support techniques for determining CSI using a neural network model in accordance with aspects of the present disclosure.

FIG. 9 shows a block diagram 900 of a device 905 that supports techniques for determining CSI using a neural network model in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for determining CSI using a neural network model). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for determining CSI using a neural network model). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for determining CSI using a neural network model as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting a first indication of a first number of antenna ports for which a UE is to report CSI, and a second indication of a second number of antenna ports on which the UE is to measure CSI-RSs, the second number of antenna ports being less than the first number of antenna ports. The communications manager 920 may be configured as or otherwise support a means for transmitting a third indication of one or more neural networks to be used by the UE for determination of the CSI associated with the first number of antenna ports. The communications manager 920 may be configured as or otherwise support a means for receiving a report including the CSI associated with the first number of antenna ports determined via the one or more neural networks.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, reduced signaling overhead, and more efficient utilization of communication resources.

Figure 10:
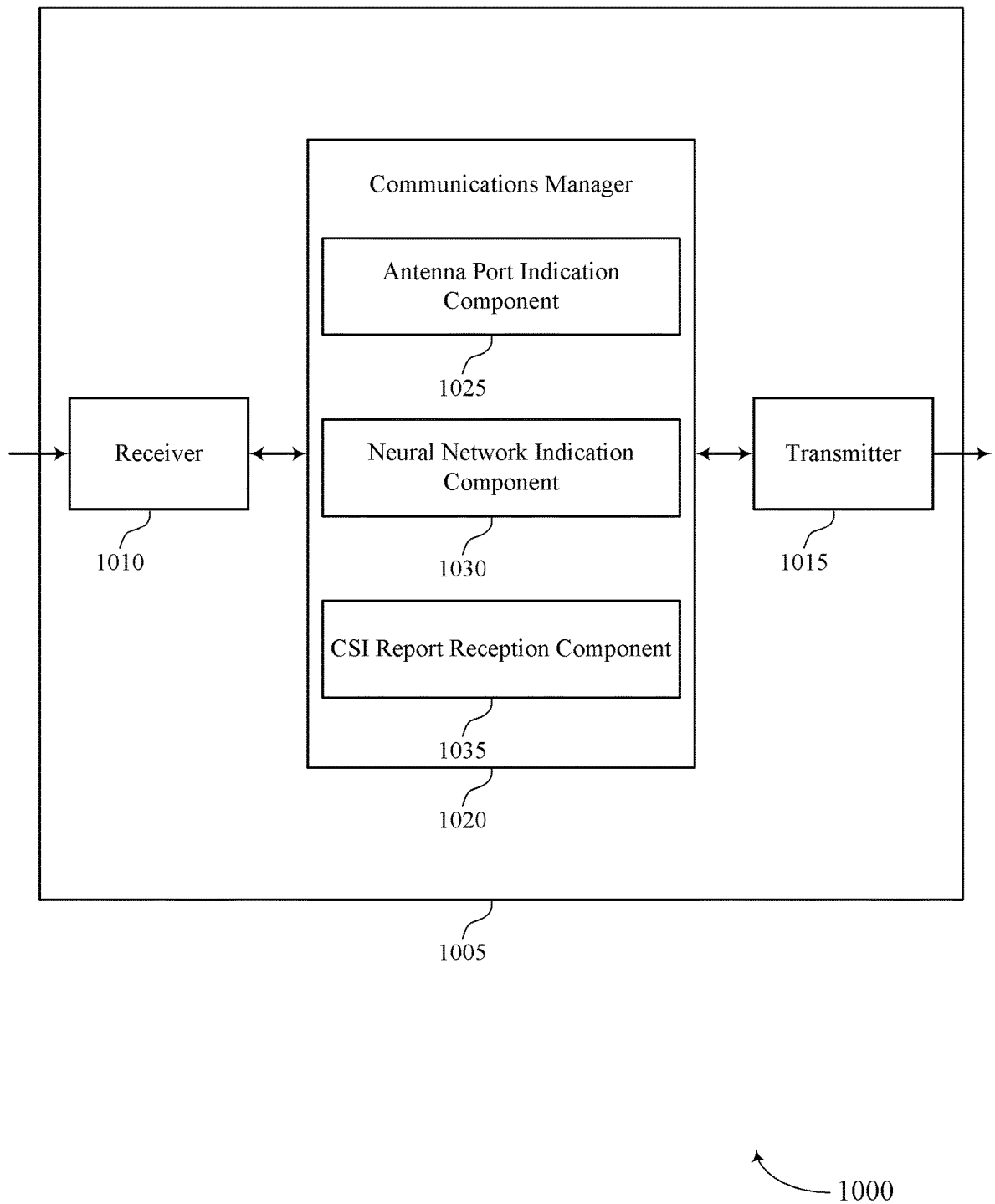

FIG. 10 shows a block diagram 1000 of a device 1005 that supports techniques for determining CSI using a neural network model in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for determining CSI using a neural network model). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for determining CSI using a neural network model). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for determining CSI using a neural network model as described herein. For example, the communications manager 1020 may include an antenna port indication component 1025, a neural network indication component 1030, a CSI report reception component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The antenna port indication component 1025 may be configured as or otherwise support a means for transmitting a first indication of a first number of antenna ports for which a UE is to report CSI, and a second indication of a second number of antenna ports on which the UE is to measure CSI-RSs, the second number of antenna ports being less than the first number of antenna ports. The neural network indication component 1030 may be configured as or otherwise support a means for transmitting a third indication of one or more neural networks to be used by the UE for determination of the CSI associated with the first number of antenna ports. The CSI report reception component 1035 may be configured as or otherwise support a means for receiving a report including the CSI associated with the first number of antenna ports determined via the one or more neural networks.

Figure 11:
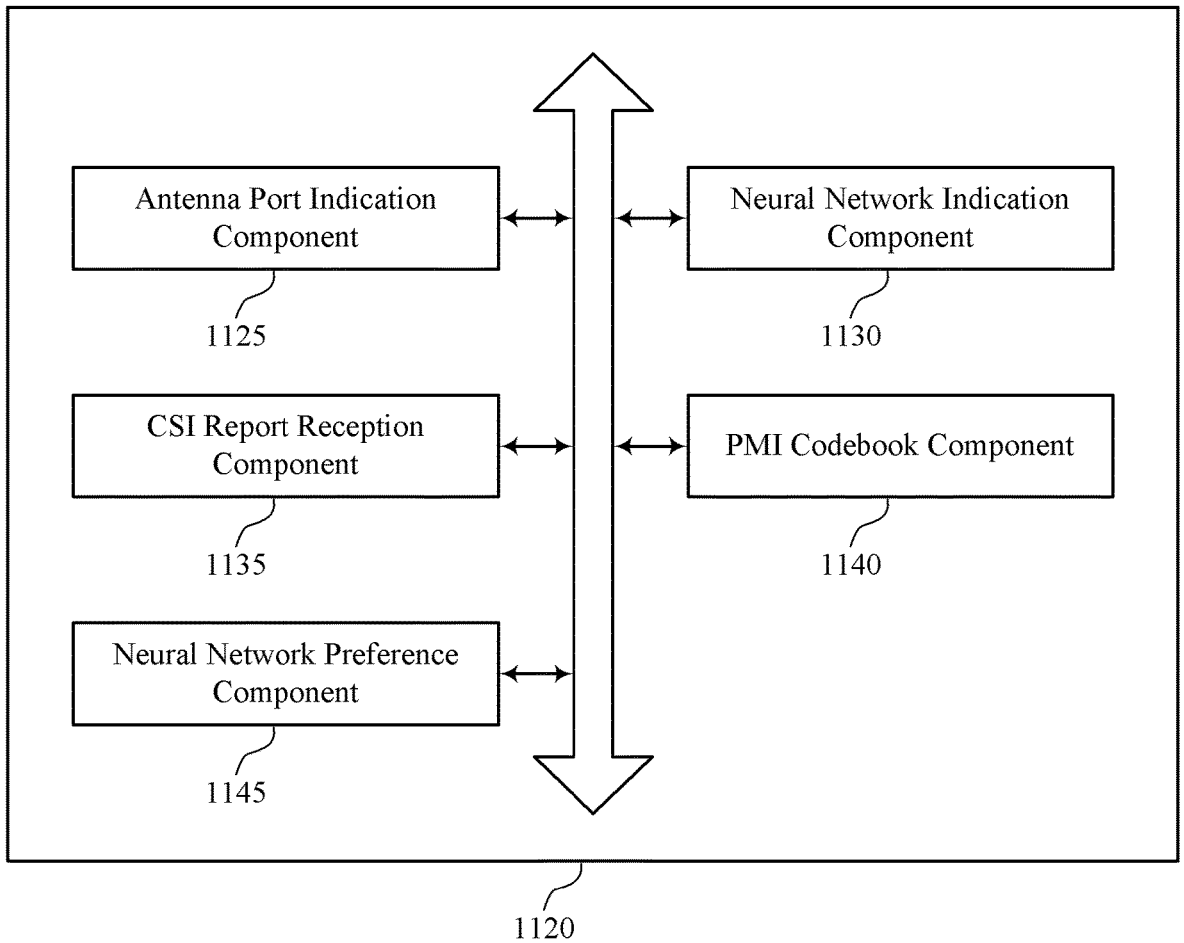
FIG. 11 shows a block diagram of a communications manager that supports techniques for determining CSI using a neural network model in accordance with aspects of the present disclosure.

FIG. 11 shows a block diagram 1100 of a communications manager 1120 that supports techniques for determining CSI using a neural network model in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for determining CSI using a neural network model as described herein. For example, the communications manager 1120 may include an antenna port indication component 1125, a neural network indication component 1130, a CSI report reception component 1135, a PMI codebook component 1140, a neural network preference component 1145, or any combination thereof. Each of these components may communicate, directly or indirectly, with one another (e.g., via one or more buses).

The communications manager 1120 may support wireless communications at a base station in accordance with examples as disclosed herein. The antenna port indication component 1125 may be configured as or otherwise support a means for transmitting a first indication of a first number of antenna ports for which a UE is to report CSI, and a second indication of a second number of antenna ports on which the UE is to measure CSI-RSs, the second number of antenna ports being less than the first number of antenna ports. The neural network indication component 1130 may be configured as or otherwise support a means for transmitting a third indication of one or more neural networks to be used by the UE for determination of the CSI associated with the first number of antenna ports. The CSI report reception component 1135 may be configured as or otherwise support a means for receiving a report including the CSI associated with the first number of antenna ports determined via the one or more neural networks.

In some examples, the PMI codebook component 1140 may be configured as or otherwise support a means for transmitting a message indicating a precoding matrix codebook, the precoding matrix codebook configured for neural network based PMI selection.

In some examples, to support transmitting the message indicating the precoding matrix codebook, the PMI codebook component 1140 may be configured as or otherwise support a means for transmitting a CSI report configuration, the CSI report configuration including the precoding matrix codebook.

In some examples, to support transmitting the message indicating the precoding matrix codebook, the PMI codebook component 1140 may be configured as or otherwise support a means for transmitting a trigger message triggering the UE to transmit the report including the CSI, the trigger message including the precoding matrix codebook.

In some examples, to support transmitting the third indication of the one or more neural networks, the neural network indication component 1130 may be configured as or otherwise support a means for transmitting one or more indices, each index of the one or more indices indicating a neural network to be used by the UE for determination of the CSI.

In some examples, to support transmitting the third indication of the one or more neural networks, the neural network indication component 1130 may be configured as or otherwise support a means for transmitting a message indicating of a first antenna pattern associated with the first number of antenna ports, and indicating a second antenna pattern associated with the second number of antenna ports, the first antenna pattern and the second antenna pattern indicating the one or more neural networks, where the second number of antenna ports with which the second antenna pattern is associated is a subset of the first number of antenna ports.

In some examples, to support transmitting the third indication of the one or more neural networks, the neural network indication component 1130 may be configured as or otherwise support a means for transmitting a message indicating a first set of bases associated with the first number of antenna ports, and indicating a second set of bases associated with the second number of antenna ports, the first set of bases and the second set of bases indicating the one or more neural networks, where the second number of antenna ports with which the second set of bases is associated is a subset of the first number of antenna ports.

In some examples, to support transmitting the second indication of the second number of antenna ports, the neural network indication component 1130 may be configured as or otherwise support a means for transmitting a message indicating a set of neural networks to be used by the UE for determination of the second number of antenna ports, the set of neural networks including at least one neural network.

In some examples, the neural network preference component 1145 may be configured as or otherwise support a means for receiving a signal indicating a preference of the UE to use the set of neural networks, where transmitting the message indicating the set of neural networks is based on receiving the signal indicating the preference.

Figure 12:
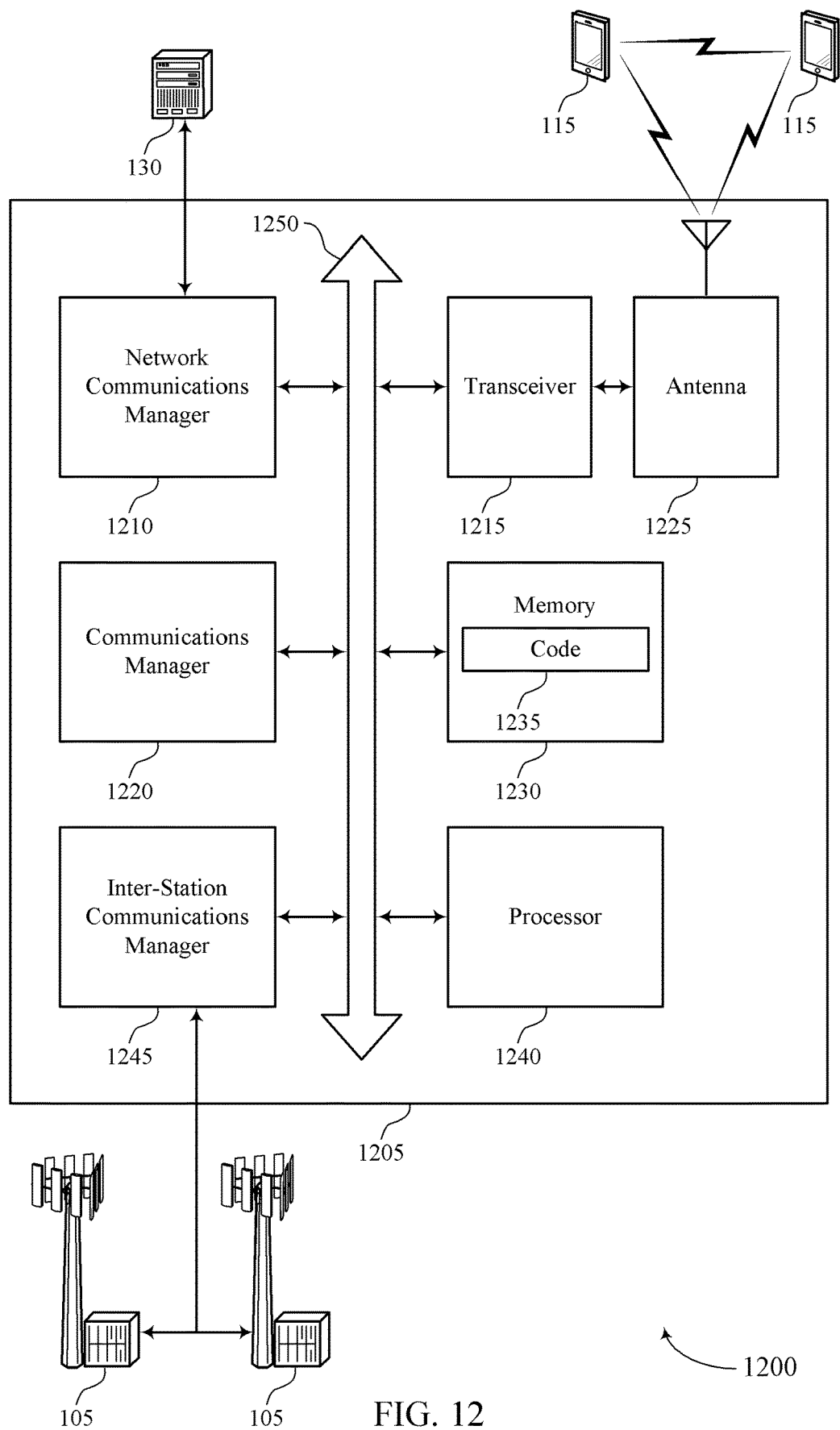
FIG. 12 shows a diagram of a system including a device that supports techniques for determining CSI using a neural network model in accordance with aspects of the present disclosure.

FIG. 12 shows a diagram of a system 1200 including a device 1205 that supports techniques for determining CSI using a neural network model in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for determining CSI using a neural network model). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting a first indication of a first number of antenna ports for which a UE is to report CSI, and a second indication of a second number of antenna ports on which the UE is to measure CSI-RSs, the second number of antenna ports being less than the first number of antenna ports. The communications manager 1220 may be configured as or otherwise support a means for transmitting a third indication of one or more neural networks to be used by the UE for determination of the CSI associated with the first number of antenna ports. The communications manager 1220 may be configured as or otherwise support a means for receiving a report including the CSI associated with the first number of antenna ports determined via the one or more neural networks.

By including or configuring the communications manager 1220 in accordance with examples as described herein, the device 1205 may support techniques for improved communication reliability, reduced latency, improved user experience related to reduced processing, reduced signaling overhead, and more efficient utilization of communication resources.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for determining CSI using a neural network model as described herein, or the processor 1240 and the memory 1230 may be otherwise configured to perform or support such operations.

Figure 13:
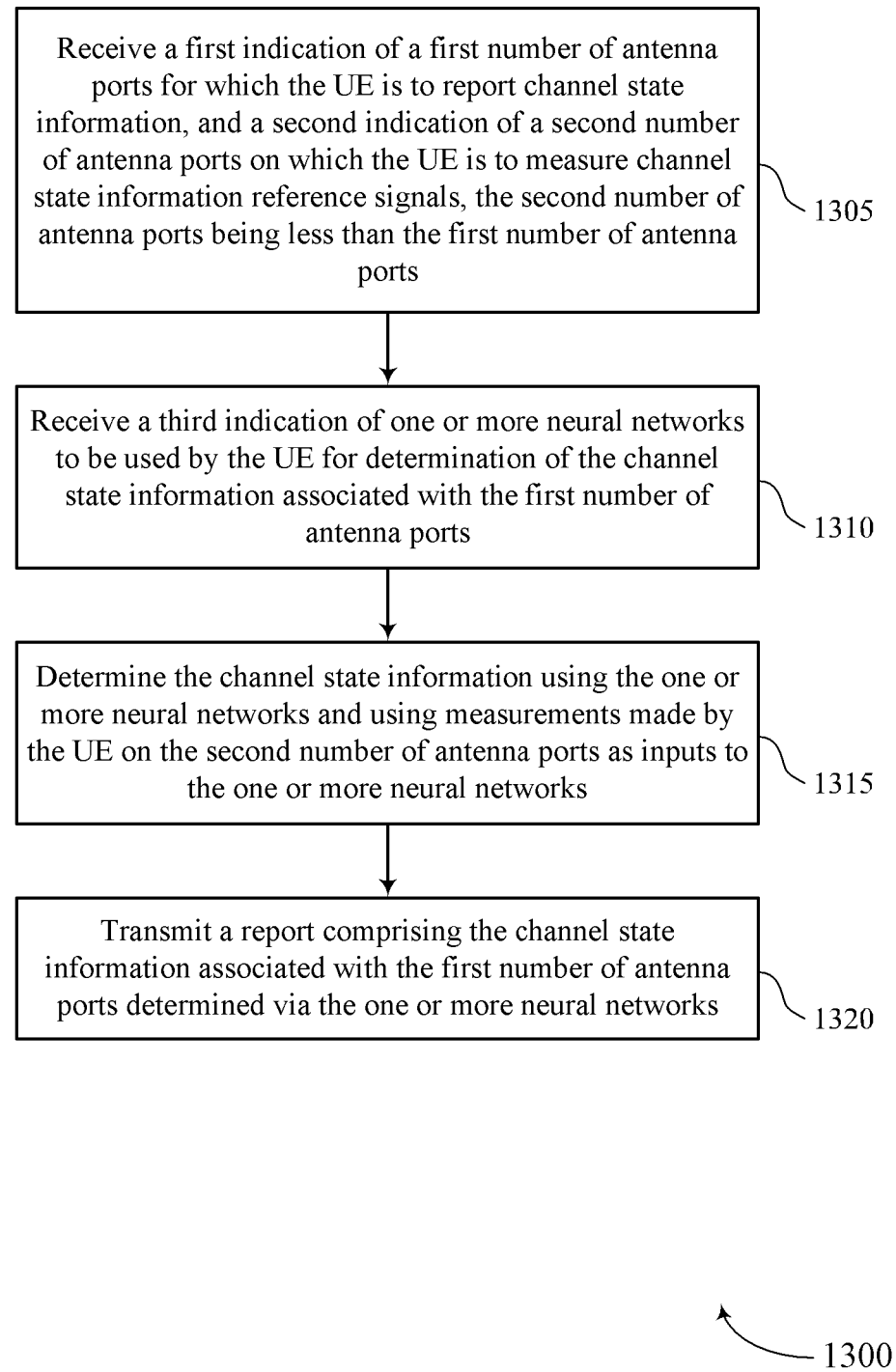
FIGS. 13 through 16 show flowcharts illustrating methods that support techniques for determining CSI using a neural network model in accordance with aspects of the present disclosure.

FIG. 13 shows a flowchart illustrating a method 1300 that supports techniques for determining CSI using a neural network model in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving a first indication of a first number of antenna ports for which the UE is to report CSI, and a second indication of a second number of antenna ports on which the UE is to measure CSI-RSs, the second number of antenna ports being less than the first number of antenna ports. The operations of 1305 may be performed in accordance with examples as disclosed herein. In some examples, aspects of the operations of 1305 may be performed by an antenna port indication manager 725 as described with reference to FIG. 7.

At 1310, the method may include receiving a third indication of one or more neural networks to be used by the UE for determination of the CSI associated with the first number of antenna ports. The operations of 1310 may be performed in accordance with examples as disclosed herein. In some examples, aspects of the operations of 1310 may be performed by a neural network indication manager 730 as described with reference to FIG. 7.

At 1315, the method may include determining the CSI using the one or more neural networks and using measurements made by the UE on the second number of antenna ports as inputs to the one or more neural networks. The operations of 1315 may be performed in accordance with examples as disclosed herein. In some examples, aspects of the operations of 1315 may be performed by a CSI determination manager 735 as described with reference to FIG. 7.

At 1320, the method may include transmitting a report including the CSI associated with the first number of antenna ports determined via the one or more neural networks. The operations of 1320 may be performed in accordance with examples as disclosed herein. In some examples, aspects of the operations of 1320 may be performed by a CSI report transmission manager 740 as described with reference to FIG. 7.

Figure 14:
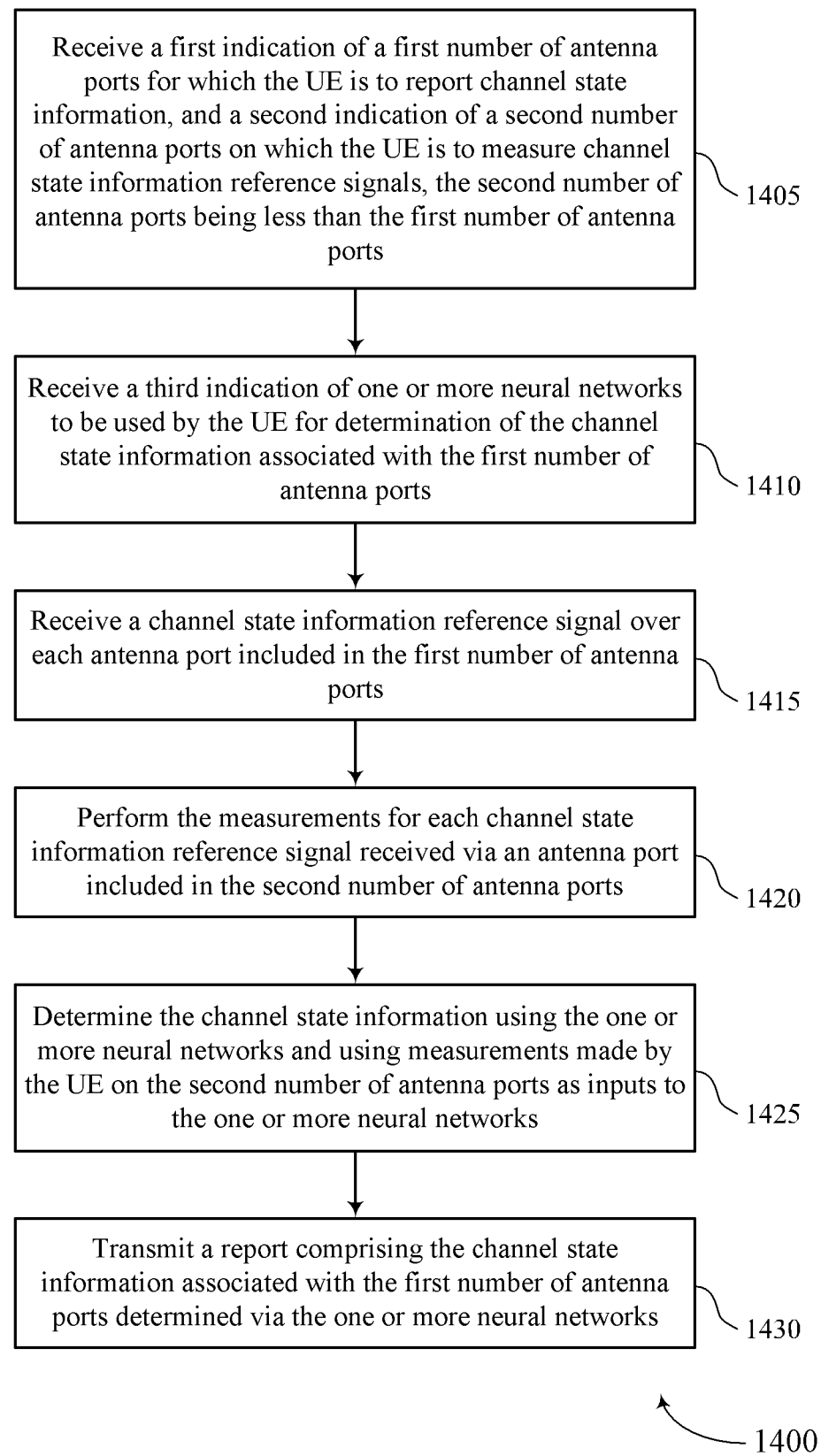

FIG. 14 shows a flowchart illustrating a method 1400 that supports techniques for determining CSI using a neural network model in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving a first indication of a first number of antenna ports for which the UE is to report CSI, and a second indication of a second number of antenna ports on which the UE is to measure CSI-RSs, the second number of antenna ports being less than the first number of antenna ports. The operations of 1405 may be performed in accordance with examples as disclosed herein. In some examples, aspects of the operations of 1405 may be performed by an antenna port indication manager 725 as described with reference to FIG. 7.

At 1410, the method may include receiving a third indication of one or more neural networks to be used by the UE for determination of the CSI associated with the first number of antenna ports. The operations of 1410 may be performed in accordance with examples as disclosed herein. In some examples, aspects of the operations of 1410 may be performed by a neural network indication manager 730 as described with reference to FIG. 7.

At 1415, the method may include receiving a CSI-RS over each antenna port included in the first number of antenna ports. The operations of 1415 may be performed in accordance with examples as disclosed herein. In some examples, aspects of the operations of 1415 may be performed by a CSI-RS manager 765 as described with reference to FIG. 7.

At 1420, the method may include performing the measurements for each CSI-RS received via an antenna port included in the second number of antenna ports. The operations of 1420 may be performed in accordance with examples as disclosed herein. In some examples, aspects of the operations of 1420 may be performed by a CSI-RS manager 765 as described with reference to FIG. 7.

At 1425, the method may include determining the CSI using the one or more neural networks and using measurements made by the UE on the second number of antenna ports as inputs to the one or more neural networks. The operations of 1425 may be performed in accordance with examples as disclosed herein. In some examples, aspects of the operations of 1425 may be performed by a CSI determination manager 735 as described with reference to FIG. 7.

At 1430, the method may include transmitting a report including the CSI associated with the first number of antenna ports determined via the one or more neural networks. The operations of 1430 may be performed in accordance with examples as disclosed herein. In some examples, aspects of the operations of 1430 may be performed by a CSI report transmission manager 740 as described with reference to FIG. 7.

Figure 15:
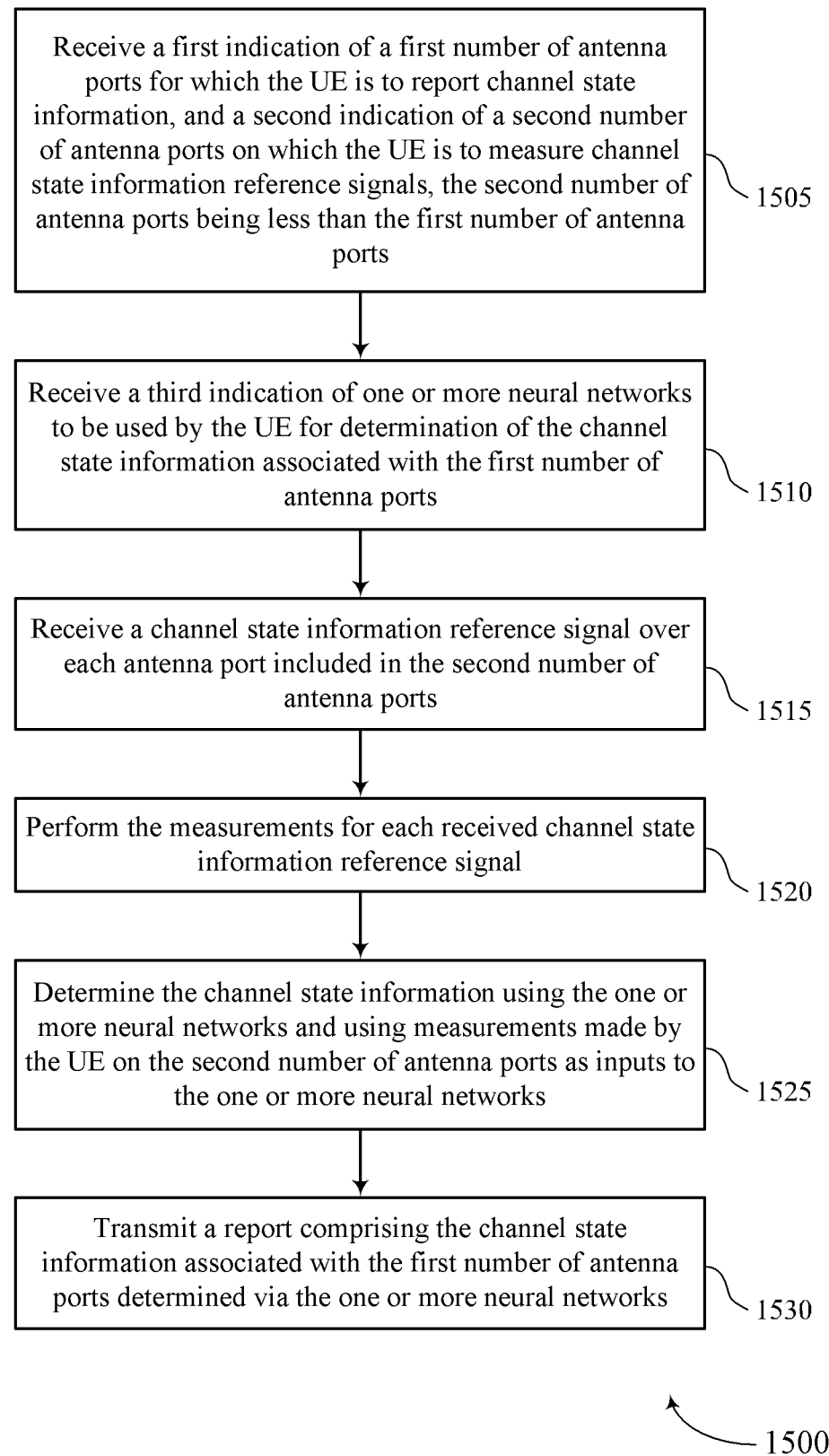

FIG. 15 shows a flowchart illustrating a method 1500 that supports techniques for determining CSI using a neural network model in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving a first indication of a first number of antenna ports for which the UE is to report CSI, and a second indication of a second number of antenna ports on which the UE is to measure CSI-RSs, the second number of antenna ports being less than the first number of antenna ports. The operations of 1505 may be performed in accordance with examples as disclosed herein. In some examples, aspects of the operations of 1505 may be performed by an antenna port indication manager 725 as described with reference to FIG. 7.

At 1510, the method may include receiving a third indication of one or more neural networks to be used by the UE for determination of the CSI associated with the first number of antenna ports. The operations of 1510 may be performed in accordance with examples as disclosed herein. In some examples, aspects of the operations of 1510 may be performed by a neural network indication manager 730 as described with reference to FIG. 7.

At 1515, the method may include receiving a CSI-RS over each antenna port included in the second number of antenna ports. The operations of 1515 may be performed in accordance with examples as disclosed herein. In some examples, aspects of the operations of 1515 may be performed by a CSI-RS manager 765 as described with reference to FIG. 7.

At 1520, the method may include performing the measurements for each received CSI-RS. The operations of 1520 may be performed in accordance with examples as disclosed herein. In some examples, aspects of the operations of 1520 may be performed by a CSI-RS manager 765 as described with reference to FIG. 7.

At 1525, the method may include determining the CSI using the one or more neural networks and using measurements made by the UE on the second number of antenna ports as inputs to the one or more neural networks. The operations of 1525 may be performed in accordance with examples as disclosed herein. In some examples, aspects of the operations of 1525 may be performed by a CSI determination manager 735 as described with reference to FIG. 7.

At 1530, the method may include transmitting a report including the CSI associated with the first number of antenna ports determined via the one or more neural networks. The operations of 1530 may be performed in accordance with examples as disclosed herein. In some examples, aspects of the operations of 1530 may be performed by a CSI report transmission manager 740 as described with reference to FIG. 7.

Figure 16:
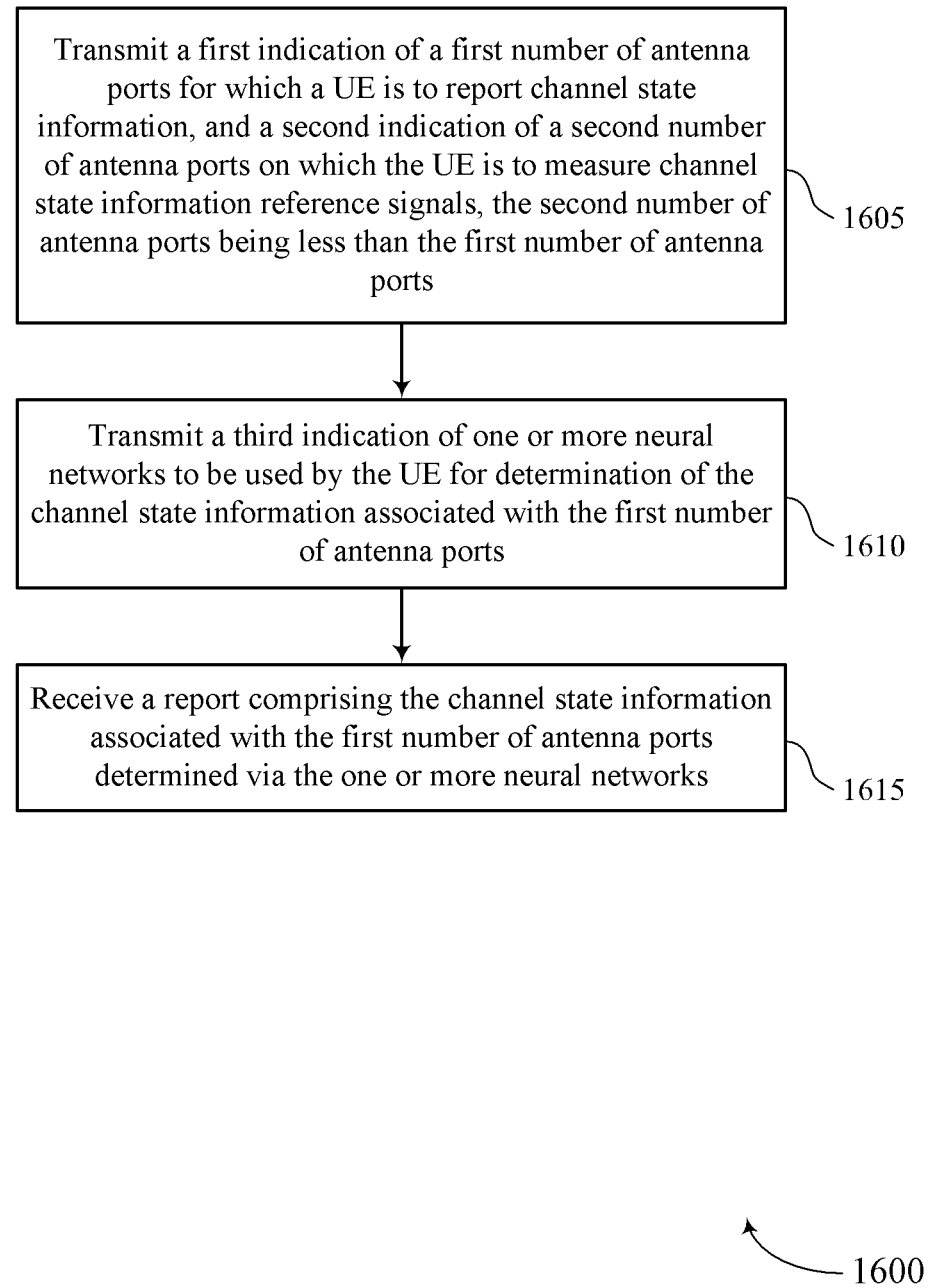

FIG. 16 shows a flowchart illustrating a method 1600 that supports techniques for determining CSI using a neural network model in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting a first indication of a first number of antenna ports for which a UE is to report CSI, and a second indication of a second number of antenna ports on which the UE is to measure CSI-RSs, the second number of antenna ports being less than the first number of antenna ports. The operations of 1605 may be performed in accordance with examples as disclosed herein. In some examples, aspects of the operations of 1605 may be performed by an antenna port indication component 1125 as described with reference to FIG. 11.

At 1610, the method may include transmitting a third indication of one or more neural networks to be used by the UE for determination of the CSI associated with the first number of antenna ports. The operations of 1610 may be performed in accordance with examples as disclosed herein. In some examples, aspects of the operations of 1610 may be performed by a neural network indication component 1130 as described with reference to FIG. 11.

At 1615, the method may include receiving a report including the CSI associated with the first number of antenna ports determined via the one or more neural networks. The operations of 1615 may be performed in accordance with examples as disclosed herein. In some examples, aspects of the operations of 1615 may be performed by a CSI report reception component 1135 as described with reference to FIG. 11.

The following provides an overview of aspects of the present disclosure:

Aspect 1: A method for wireless communications at a UE, comprising: receiving a first indication of a first number of antenna ports for which the UE is to report channel state information, and a second indication of a second number of antenna ports on which the UE is to measure channel state information reference signals, the second number of antenna ports being less than the first number of antenna ports; receiving a third indication of one or more neural networks to be used by the UE for determination of the channel state information associated with the first number of antenna ports; determining the channel state information using the one or more neural networks and using measurements made by the UE on the second number of antenna ports as inputs to the one or more neural networks; and transmitting a report comprising the channel state information associated with the first number of antenna ports determined via the one or more neural networks.

Aspect 2: The method of aspect 1, wherein determining the channel state information further comprises: estimating a channel condition for each antenna port associated with the first number of antenna ports using the one or more neural networks and using the measurements made by the UE on the second number of antenna ports as inputs to the one or more neural networks.

Aspect 3: The method of aspect 2, further comprising: identifying one or more precoding matrix indicators for the first number of antenna ports based at least in part on the channel condition estimated for each antenna port associated with the first number of antenna ports.

Aspect 4: The method of any of aspects 1 through 3, wherein determining the channel state information further comprises: identifying one or more precoding matrix indicators for the first number of antenna ports using the one or more neural networks and using the measurements made by the UE on the second number of antenna ports as inputs to the one or more neural networks.

Aspect 5: The method of aspect 4, further comprising: receiving a message indicating a precoding matrix codebook, the precoding matrix codebook configured for neural network based precoding matrix indicator identification, wherein the one or more precoding matrix indicators are identified from the precoding matrix codebook.

Aspect 6: The method of aspect 5, wherein receiving the message indicating the precoding matrix codebook further comprises: receiving a channel state information report configuration, the channel state information report configuration comprising the precoding matrix codebook.

Aspect 7: The method of aspect 5, wherein receiving the message indicating the precoding matrix codebook further comprises: receiving a trigger message triggering the UE to transmit the report comprising the channel state information, the trigger message comprising the precoding matrix codebook.

Aspect 8: The method of any of aspects 1 through 7, wherein receiving the third indication of the one or more neural networks further comprises: receiving one or more indices, each index of the one or more indices indicating a neural network to be used by the UE for determination of the channel state information.

Aspect 9: The method of any of aspects 1 through 8, wherein receiving the third indication of the one or more neural networks further comprises: receiving a message indicating a first antenna pattern associated with the first number of antenna ports, and indicating a second antenna pattern associated with the second number of antenna ports, wherein the second number of antenna ports with which the second antenna pattern is associated is a subset of the first number of antenna ports; and identifying the one or more neural networks to be used by the UE for the determination of the channel state information based at least in part on the first antenna pattern and the second antenna pattern.

Aspect 10: The method of any of aspects 1 through 8, wherein receiving the third indication of the one or more neural networks further comprises: receiving a message indicating a first set of bases associated with the first number of antenna ports, and indicating a second set of bases associated with the second number of antenna ports, wherein the second number of antenna ports with which the second set of bases are associated is a subset of the first number of antenna ports; and identifying the one or more neural networks to be used by the UE for the determination of the channel state information based at least in part on the first set of bases and the second set of bases.

Aspect 11: The method of any of aspects 1 through 10, wherein receiving the third indication of the one or more neural networks further comprises: receiving a channel state information reporting configuration, the channel state information reporting configuration comprising the third indication of the one or more neural networks.

Aspect 12: The method of any of aspects 1 through 10, wherein receiving the third indication of the one or more neural networks further comprises: receiving a channel state information resource configuration, the channel state information resource configuration comprising the third indication of the one or more neural networks.

Aspect 13: The method of any of aspects 1 through 12, wherein receiving the second indication of the second number of antenna ports further comprises: receiving a message indicating a set of neural networks to be used by the UE for determination of the second number of antenna ports, the set of neural networks comprising at least one neural network; and determining the second number of antenna ports using the set of neural networks and using the first number of antenna ports as inputs to the set of neural networks.

Aspect 14: The method of aspect 13, further comprising: determining a preference of the UE to use the set of neural networks to determine the second number of antenna ports; transmitting a signal indicating the preference of the UE to use the set of neural networks, wherein receiving the message indicating the set of neural networks is based at least in part on transmitting the signal indicating the preference.

Aspect 15: The method of any of aspects 1 through 14, further comprising: receiving a channel state information reference signal over each antenna port included in the first number of antenna ports; and performing the measurements for each channel state information reference signal received via an antenna port included in the second number of antenna ports.

Aspect 16: The method of any of aspects 1 through 14, further comprising: receiving a channel state information reference signal over each antenna port included in the second number of antenna ports; and performing the measurements for each received channel state information reference signal.

Aspect 17: The method of any of aspects 1 through 16, wherein a size of each neural network of the one or more neural networks is based at least in part on the first number of antenna ports, the second number of antenna ports, a ratio between the first number of antenna ports and the second number of antenna ports, a pattern associated with the first number of antenna ports, or a pattern associated with the second number of antenna ports, or a combination thereof.

Aspect 18: The method of any of aspects 1 through 17, wherein the third indication includes the one or more neural networks based at least in part on a UE-specific configuration, a cell-specific configuration, or a group-specific configuration.

Aspect 19: The method of any of aspects 1 through 18, wherein the first indication of the first number of antenna ports identifies a first set of antenna ports comprising a quantity of antenna ports equal to the first number and the second indication of the second number of antenna ports identifies a second set of antenna ports comprising a quantity of antenna ports equal to the second number.

Aspect 20: A method for wireless communications at a base station, comprising: transmitting a first indication of a first number of antenna ports for which a UE is to report channel state information, and a second indication of a second number of antenna ports on which the UE is to measure channel state information reference signals, the second number of antenna ports being less than the first number of antenna ports; transmitting a third indication of one or more neural networks to be used by the UE for determination of the channel state information associated with the first number of antenna ports; and receiving a report comprising the channel state information associated with the first number of antenna ports determined via the one or more neural networks.

Aspect 21: The method of aspect 20, further comprising: transmitting a message indicating a precoding matrix codebook, the precoding matrix codebook configured for neural network based precoding matrix indicator selection.

Aspect 22: The method of aspect 21, wherein transmitting the message indicating the precoding matrix codebook further comprises: transmitting a channel state information report configuration, the channel state information report configuration comprising the precoding matrix codebook.

Aspect 23: The method of aspect 21, wherein transmitting the message indicating the precoding matrix codebook further comprises: transmitting a trigger message triggering the UE to transmit the report comprising the channel state information, the trigger message comprising the precoding matrix codebook.

Aspect 24: The method of any of aspects 20 through 23, wherein transmitting the third indication of the one or more neural networks further comprises: transmitting one or more indices, each index of the one or more indices indicating a neural network to be used by the UE for determination of the channel state information.

Aspect 25: The method of any of aspects 20 through 24, wherein transmitting the third indication of the one or more neural networks further comprises: transmitting a message indicating of a first antenna pattern associated with the first number of antenna ports, and indicating a second antenna pattern associated with the second number of antenna ports, the first antenna pattern and the second antenna pattern indicating the one or more neural networks, wherein the second number of antenna ports with which the second antenna pattern is associated is a subset of the first number of antenna ports.

Aspect 26: The method of any of aspects 20 through 24, wherein transmitting the third indication of the one or more neural networks further comprises: transmitting a message indicating a first set of bases associated with the first number of antenna ports, and indicating a second set of bases associated with the second number of antenna ports, the first set of bases and the second set of bases indicating the one or more neural networks, wherein the second number of antenna ports with which the second set of bases is associated is a subset of the first number of antenna ports.

Aspect 27: The method of any of aspects 20 through 26, wherein transmitting the second indication of the second number of antenna ports further comprises: transmitting a message indicating a set of neural networks to be used by the UE for determination of the second number of antenna ports, the set of neural networks comprising at least one neural network.

Aspect 28: The method of aspect 27, further comprising: receiving a signal indicating a preference of the UE to use the set of neural networks, wherein transmitting the message indicating the set of neural networks is based at least in part on receiving the signal indicating the preference.

Aspect 29: An apparatus for wireless communications, comprising a processor; memory coupled with the processor; and instructions stored in the memory and executable by the processor to cause the apparatus to perform a method of any of aspects 1 through 19.

Aspect 30: An apparatus for wireless communications at a UE, comprising at least one means for performing a method of any of aspects 1 through 19.

Aspect 31: A non-transitory computer-readable medium storing code for wireless communications at a UE, the code comprising instructions executable by a processor to perform a method of any of aspects 1 through 19.

Aspect 32: An apparatus for wireless communications, comprising a processor; memory coupled with the processor; and instructions stored in the memory and executable by the processor to cause the apparatus to perform a method of any of aspects 20 through 28.

Aspect 33: An apparatus for wireless communications at a base station, comprising at least one means for performing a method of any of aspects 20 through 28.

Aspect 34: A non-transitory computer-readable medium storing code for wireless communications at a base station, the code comprising instructions executable by a processor to perform a method of any of aspects 20 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving a first indication of a first number of antenna ports for which the UE is to report channel state information, and a second indication of a second number of antenna ports on which the UE is to measure channel state information reference signals, the second number of antenna ports being less than the first number of antenna ports;
   receiving a third indication of one or more neural networks to be used by the UE for determination of the channel state information associated with the first number of antenna ports;
   determining the channel state information associated with the first number of antenna ports using the one or more neural networks and using measurements made by the UE on the second number of antenna ports as inputs to the one or more neural networks; and
   transmitting a report comprising the channel state information associated with the first number of antenna ports determined via the one or more neural networks.

2. The method of claim 1, wherein determining the channel state information further comprises:
   estimating a channel condition for each antenna port associated with the first number of antenna ports using the one or more neural networks and using the measurements made by the UE on the second number of antenna ports as inputs to the one or more neural networks.

3. The method of claim 2, further comprising:
   identifying one or more precoding matrix indicators for the first number of antenna ports based at least in part on the channel condition estimated for each antenna port associated with the first number of antenna ports.

4. The method of claim 1, wherein determining the channel state information further comprises:
   identifying one or more precoding matrix indicators for the first number of antenna ports using the one or more neural networks and using the measurements made by the UE on the second number of antenna ports as inputs to the one or more neural networks.

5. The method of claim 4, further comprising:
   receiving a message indicating a precoding matrix codebook, the precoding matrix codebook configured for neural network based precoding matrix indicator identification, wherein the one or more precoding matrix indicators are identified from the precoding matrix codebook.

6. The method of claim 5, wherein receiving the message indicating the precoding matrix codebook further comprises:
   receiving a channel state information report configuration, the channel state information report configuration comprising the precoding matrix codebook.

7. The method of claim 5, wherein receiving the message indicating the precoding matrix codebook further comprises:
   receiving a trigger message triggering the UE to transmit the report comprising the channel state information, the trigger message comprising the precoding matrix codebook.

8. The method of claim 1, wherein receiving the third indication of the one or more neural networks further comprises:
   receiving one or more indices, each index of the one or more indices indicating a neural network to be used by the UE for determination of the channel state information.

9. The method of claim 1, wherein receiving the third indication of the one or more neural networks further comprises:
   receiving a message indicating a first antenna pattern associated with the first number of antenna ports, and indicating a second antenna pattern associated with the second number of antenna ports, wherein the second number of antenna ports with which the second antenna pattern is associated is a subset of the first number of antenna ports; and
   identifying the one or more neural networks to be used by the UE for the determination of the channel state information based at least in part on the first antenna pattern and the second antenna pattern.

10. The method of claim 1, wherein receiving the third indication of the one or more neural networks further comprises:
    receiving a message indicating a first set of bases associated with the first number of antenna ports, and indicating a second set of bases associated with the second number of antenna ports, wherein the second number of antenna ports with which the second set of bases are associated is a subset of the first number of antenna ports; and
    identifying the one or more neural networks to be used by the UE for the determination of the channel state information based at least in part on the first set of bases and the second set of bases.

11. The method of claim 1, wherein receiving the third indication of the one or more neural networks further comprises:

receiving a channel state information reporting configuration, the channel state information reporting configuration comprising the third indication of the one or more neural networks.

12. The method of claim 1, wherein receiving the third indication of the one or more neural networks further comprises:
receiving a channel state information resource configuration, the channel state information resource configuration comprising the third indication of the one or more neural networks.

13. The method of claim 1, wherein receiving the second indication of the second number of antenna ports further comprises:
receiving a message indicating a set of neural networks to be used by the UE for determination of the second number of antenna ports, the set of neural networks comprising at least one neural network; and
determining the second number of antenna ports using the set of neural networks and using the first number of antenna ports as inputs to the set of neural networks.

14. The method of claim 13, further comprising:
determining a preference of the UE to use the set of neural networks to determine the second number of antenna ports; and
transmitting a signal indicating the preference of the UE to use the set of neural networks, wherein receiving the message indicating the set of neural networks is based at least in part on transmitting the signal indicating the preference.

15. The method of claim 1, further comprising:
receiving a channel state information reference signal over each antenna port included in the first number of antenna ports; and
performing the measurements for each channel state information reference signal received via an antenna port included in the second number of antenna ports.

16. The method of claim 1, further comprising:
receiving a channel state information reference signal over each antenna port included in the second number of antenna ports; and
performing the measurements for each received channel state information reference signal.

17. The method of claim 1, wherein a size of each neural network of the one or more neural networks is based at least in part on the first number of antenna ports, the second number of antenna ports, a ratio between the first number of antenna ports and the second number of antenna ports, a pattern associated with the first number of antenna ports, or a pattern associated with the second number of antenna ports, or a combination thereof.

18. The method of claim 1, wherein the third indication includes the one or more neural networks based at least in part on a UE-specific configuration, a cell-specific configuration, or a group-specific configuration.

19. The method of claim 1, wherein the first indication of the first number of antenna ports identifies a first set of antenna ports comprising a quantity of antenna ports equal to the first number and the second indication of the second number of antenna ports identifies a second set of antenna ports comprising a quantity of antenna ports equal to the second number.

20. A method for wireless communications at a network device, comprising:
transmitting a first indication of a first number of antenna ports for which a user equipment (UE) is to report channel state information, and a second indication of a second number of antenna ports on which the UE is to measure channel state information reference signals, the second number of antenna ports being less than the first number of antenna ports;
transmitting a third indication of one or more neural networks to be used by the UE for determination of the channel state information associated with the first number of antenna ports; and
receiving a report comprising the channel state information associated with the first number of antenna ports determined via the one or more neural networks.

21. The method of claim 20, further comprising:
transmitting a message indicating a precoding matrix codebook, the precoding matrix codebook configured for neural network based precoding matrix indicator selection.

22. The method of claim 21, wherein transmitting the message indicating the precoding matrix codebook further comprises:
transmitting a channel state information report configuration, the channel state information report configuration comprising the precoding matrix codebook.

23. The method of claim 21, wherein transmitting the message indicating the precoding matrix codebook further comprises:
transmitting a trigger message triggering the UE to transmit the report comprising the channel state information, the trigger message comprising the precoding matrix codebook.

24. The method of claim 20, wherein transmitting the third indication of the one or more neural networks further comprises:
transmitting one or more indices, each index of the one or more indices indicating a neural network to be used by the UE for determination of the channel state information.

25. The method of claim 20, wherein transmitting the third indication of the one or more neural networks further comprises:
transmitting a message indicating of a first antenna pattern associated with the first number of antenna ports, and indicating a second antenna pattern associated with the second number of antenna ports, the first antenna pattern and the second antenna pattern indicating the one or more neural networks, wherein the second number of antenna ports with which the second antenna pattern is associated is a subset of the first number of antenna ports.

26. The method of claim 20, wherein transmitting the third indication of the one or more neural networks further comprises:
transmitting a message indicating a first set of bases associated with the first number of antenna ports, and indicating a second set of bases associated with the second number of antenna ports, the first set of bases and the second set of bases indicating the one or more neural networks, wherein the second number of antenna ports with which the second set of bases is associated is a subset of the first number of antenna ports.

27. The method of claim 20, wherein transmitting the second indication of the second number of antenna ports further comprises:
transmitting a message indicating a set of neural networks to be used by the UE for determination of the second number of antenna ports, the set of neural networks comprising at least one neural network.

28. The method of claim 27, further comprising:
receiving a signal indicating a preference of the UE to use the set of neural networks, wherein transmitting the message indicating the set of neural networks is based at least in part on receiving the signal indicating the preference.

29. An apparatus for wireless communications at a user equipment (UE), comprising:
one or more processors;
memory coupled with the one or more processors; and
instructions stored in the memory and executable by the one or more processors to cause the apparatus to:
receive a first indication of a first number of antenna ports for which the UE is to report channel state information, and a second indication of a second number of antenna ports on which the UE is to measure channel state information reference signals, the second number of antenna ports being less than the first number of antenna ports;
receive a third indication of one or more neural networks to be used by the UE for determination of the channel state information associated with the first number of antenna ports;
determine the channel state information using the one or more neural networks and using measurements made by the UE on the second number of antenna ports as inputs to the one or more neural networks; and
transmit a report comprising the channel state information associated with the first number of antenna ports determined via the one or more neural networks.

30. An apparatus for wireless communications at a network device, comprising:
one or more processors;
memory coupled with the one or more processors; and
instructions stored in the memory and executable by the one or more processors to cause the apparatus to:
transmit a first indication of a first number of antenna ports for which a user equipment (UE) is to report channel state information, and a second indication of a second number of antenna ports on which the UE is to measure channel state information reference signals, the second number of antenna ports being less than the first number of antenna ports;
transmit a third indication of one or more neural networks to be used by the UE for determination of the channel state information associated with the first number of antenna ports; and
receive a report comprising the channel state information associated with the first number of antenna ports determined via the one or more neural networks.

* * * * *